US012675532B2

(12) United States Patent
Fosse et al.

(10) Patent No.: US 12,675,532 B2
(45) Date of Patent: Jul. 7, 2026

(54) CUSTOMIZED RECOMMENDATION GENERATION USING ENTERPRISE DATA ANALYSIS AND INFERENCE

(71) Applicant: Microsoft Technology Licensing, LLC, Redmond, WA (US)

(72) Inventors: Eivind Berg Fosse, Oslo (NO); Ute Katja Schiehlen, Oslo (NO); Sergey Putilin, Oslo (NO); Tinus Sola Flagstad, Oslo (NO); Mohammadreza Bonyadi, Trondheim (NO); Ola Saetrom, Oslo (NO); Espen Trautmann Sommerfelt, Oslo (NO); Torbjørn Helvik, Oslo (NO)

(73) Assignee: Microsoft Technology Licensing, LLC., Redmond, WA (US)

( * ) Notice: Subject to any disclaimer, the term of this patent is extended or adjusted under 35 U.S.C. 154(b) by 149 days.

(21) Appl. No.: 18/298,171

(22) Filed: Apr. 10, 2023

(65) Prior Publication Data

US 2024/0338413 A1    Oct. 10, 2024

(51) Int. Cl.
G06F 16/93 (2019.01)
G06F 16/21 (2019.01)
G06F 16/23 (2019.01)
(52) U.S. Cl.
CPC ............ G06F 16/93 (2019.01); G06F 16/219 (2019.01); G06F 16/2379 (2019.01)

(58) Field of Classification Search
CPC ...... G06F 16/93; G06F 16/285; G06F 16/335; G06F 16/483; G06F 40/30; G06F 16/219;
(Continued)

(56) References Cited

U.S. PATENT DOCUMENTS 9,479,469 B2    10/2016   Kabbes et al.
9,521,182 B1 *  12/2016   Tang ...................... H04L 67/02
(Continued)

FOREIGN PATENT DOCUMENTS

CN         112069314 B      5/2022

OTHER PUBLICATIONS

"Collaborate on Documents in Pages, Numbers, and Keynote on Iphone, Ipad, and Mac", Retrieved From: https://support.apple.com/en-us/HT206181, Oct. 25, 2022, 5 Pages.
(Continued)

*Primary Examiner* — Marcin R Filipczyk
(74) *Attorney, Agent, or Firm* — Foley IP Law, PLLC

(57) ABSTRACT
Systems and methods for inferring the favorite authors and collaborators of a user are provided. The method includes storing an enterprise authorship database, identifies a document accessed by a user identifier (UID), identifying contributors to the identified document, generating a contribution score for each contributor of the identified contributors, based on each generated contribution score, determining one or more authors of the identified document, creating an authorship record by associating UIDs of the determined one or more authors with the identified document, and updating the enterprise authorship database with the created authorship record, wherein the authorship record is used to identify
(Continued)

400 a relationship between the UID and the determined one or more authors and generate a recommendation for the UID based on the identified relationship.

20 Claims, 13 Drawing Sheets

(58) Field of Classification Search
CPC ............ G06F 16/2379; G06Q 30/0201; G06Q 30/0241
See application file for complete search history.

(56) References Cited

U.S. PATENT DOCUMENTS

| | | | | |
|---|---|---|---|---|
| 11,042,651 B2 * | 6/2021 | Hadi | ...................... | G06F 21/602 |
| 11,062,035 B2 * | 7/2021 | Bhardwaj | ............. | G06F 21/602 |
| 11,520,461 B2 * | 12/2022 | Wald | ...................... | G06F 3/0482 |
| 11,763,546 B1 * | 9/2023 | Saraee | ................... | G06V 10/40 |
| | | | | 382/157 |
| 2014/0304249 A1 * | 10/2014 | Ayzenshtat | ....... | G06F 16/24578 |
| | | | | 707/709 |
| 2015/0169563 A1 * | 6/2015 | Chen | ..................... | G06F 16/951 |
| | | | | 707/730 |
| 2017/0212882 A1 * | 7/2017 | Rollins | ................. | G06F 40/253 |
| 2022/0383615 A1 * | 12/2022 | Saraee | ................ | G06F 16/9535 |

OTHER PUBLICATIONS

"Creating a Commit With Multiple Authors", Retrieved From: https://docs.github.com/en/pull-requests/committing-changes-to-your-project/creating-and-editing-commits/creating-a-commit-with-multiple-authors, Retrieved Date: Feb. 9, 2023, 5 Pages.
"View Activity Dashboard in Google Docs", Retrieved From: https://www.youtube.com/watch?v=eeQuWHHAbao, Nov. 18, 2019, 2 Pages.
"Working with Comments", Retrieved From: https://help.zoho.com/portal/en/kb/writer/user-guide/reviewing-revising/comments/articles/comments#Insert_comments, Retrieved Date: Feb. 9, 2023, 9 Pages.
Adler, et al., "Measuring Author Contributions to the Wikipedia", In Proceedings of the 4th International Symposium on Wikis, Sep. 8, 2008, 10 Pages.
Boyer, et al., "Percentage-Based Author Contribution Index. A Universal, Measure of Author Contribution to Scientific Articles", In Repository of biorxiv, May 18, 2017, 9 Pages.
Ebrahimi, et al., "Developing A Mathematical Model of the Co Author Recommender System Using Graph Mining Techniques and Big Data Applications", In Journal of Big Data, vol. 8, Issue 1, Mar. 6, 2021, 15 Pages.
Zhao, et al., "Coauthorship Network Mining for Scholar Communication and Collaboration Path Recommendation", In Journal of Security and Communication Networks, Aug. 20, 2021, 11 Pages.

* cited by examiner

200

400

410

| ACTOR | ACTION | ACTION # | SIZE | IMPACT |
|-------|--------|----------|------|--------|
| UID1 (404) | CREATE | 1 | 700 | 1 |
| UID1 (404) | EDIT | 2 | 300 | 3 |
| UID2 (406) | EDIT | 3 | 200 | 2 |
| UID2 (406) | EDIT | 4 | 25 | 3 |

420

| AUTHORS | CONTRIBUTION |
|---------|--------------|
| UID2 (406) | 55% |
| UID1 (404) | 45% |

520

| UID | AUTHOR SCORE | COAUTHOR SCORE TOTAL | AUTHOR SCORE DECAYED | COAUTHOR SCORE DECAYED | LAST MODIFIED TIME | AUTHOR BUCKETS | COAUTHOR BUCKETS |
|---|---|---|---|---|---|---|---|
| 00001 | 49.121425 | 4.391667 | 1.780226 | 0.414013 | 2022-12-13 T08:39:31.836177822 | 2022-09-18:T00:00:00 | 2022-10-16:T00:00:00 |
| 00002 | 13.403120 | 3.095238 | 0.243804 | 0.232405 | 2022-12-13 T08:40:07.821422 | 2022-10-09:T00:00:00 | 2022-10-19:T00:00:00 |

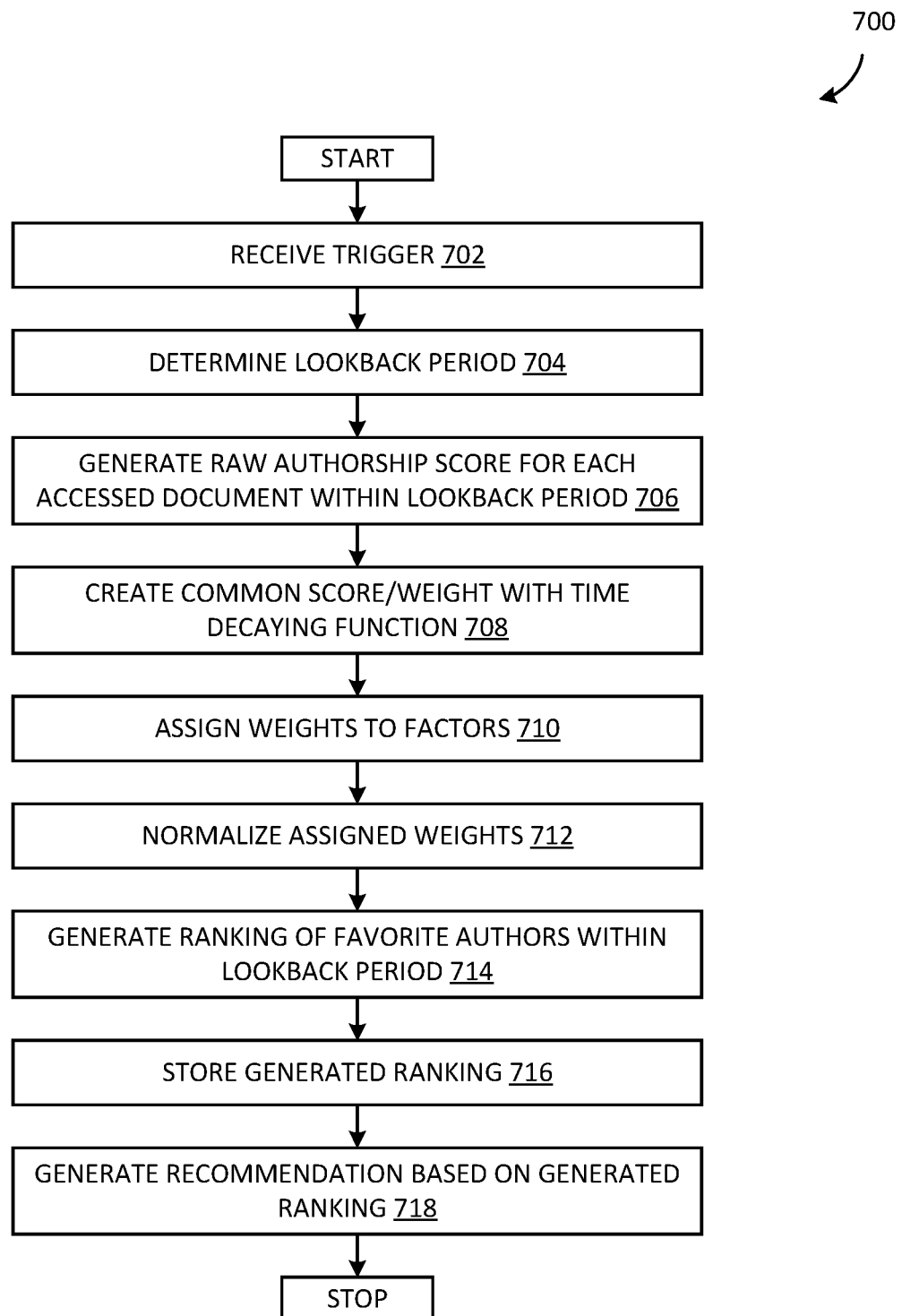

START

RECEIVE TRIGGER 702

DETERMINE LOOKBACK PERIOD 704

GENERATE RAW AUTHORSHIP SCORE FOR EACH ACCESSED DOCUMENT WITHIN LOOKBACK PERIOD 706

CREATE COMMON SCORE/WEIGHT WITH TIME DECAYING FUNCTION 708

ASSIGN WEIGHTS TO FACTORS 710

NORMALIZE ASSIGNED WEIGHTS 712

GENERATE RANKING OF FAVORITE AUTHORS WITHIN LOOKBACK PERIOD 714

STORE GENERATED RANKING 716

GENERATE RECOMMENDATION BASED ON GENERATED RANKING 718

STOP

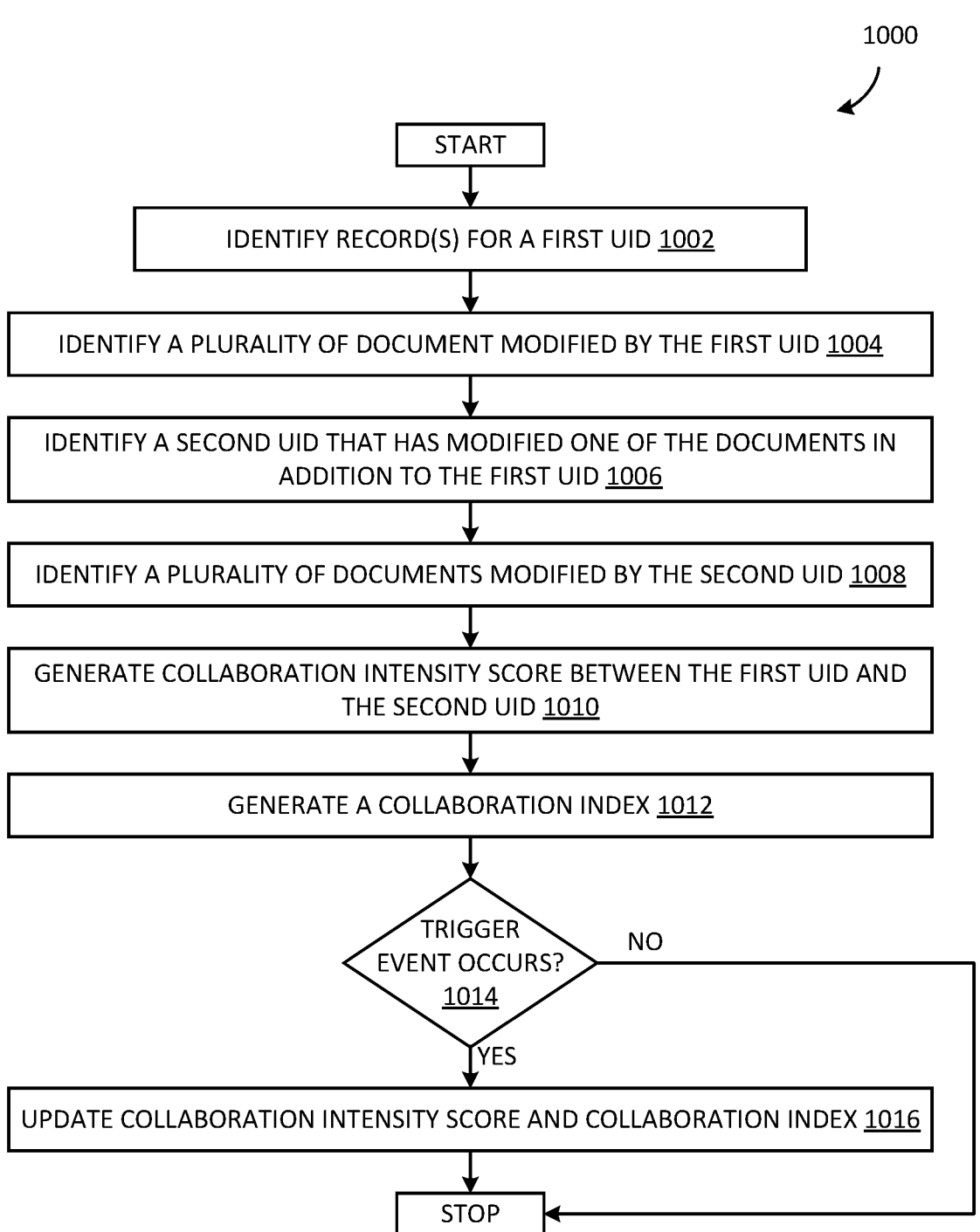

START

IDENTIFY RECORD(S) FOR A FIRST UID 1002

IDENTIFY A PLURALITY OF DOCUMENT MODIFIED BY THE FIRST UID 1004

IDENTIFY A SECOND UID THAT HAS MODIFIED ONE OF THE DOCUMENTS IN ADDITION TO THE FIRST UID 1006

IDENTIFY A PLURALITY OF DOCUMENTS MODIFIED BY THE SECOND UID 1008

GENERATE COLLABORATION INTENSITY SCORE BETWEEN THE FIRST UID AND THE SECOND UID 1010

GENERATE A COLLABORATION INDEX 1012

TRIGGER EVENT OCCURS? 1014

NO

YES

UPDATE COLLABORATION INTENSITY SCORE AND COLLABORATION INDEX 1016

STOP

FIG. 10

CUSTOMIZED RECOMMENDATION GENERATION USING ENTERPRISE DATA ANALYSIS AND INFERENCE

BACKGROUND

In an enterprise environment, such as a workplace setting, a user spends a considerable amount of time interacting with various types of documents and files. Over time, a user may interact with multiple documents from a particular source or author, or associated with a particular topic. A user may also collaborate with others within the enterprise environment to contribute towards creating new documents or files related to various topics.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system for inferring a favorite author of a user is disclosed. The system includes a memory storing an enterprise authorship database and a processor communicatively coupled to the memory. The processor identifies a document accessed by a user identifier (UID), identifies contributors to the identified document, generates a contribution score for each contributor of the identified contributors, based on each generated contribution score, determines one or more authors of the identified document, creates an authorship record by associating UIDs of the determined one or more authors with the identified document, and updates the enterprise authorship database with the created authorship record, wherein the authorship record is used to identify a relationship between the UID and the identified one or more authors and generate a recommendation for the UID based on the identified relationship.

BRIEF DESCRIPTION OF THE DRAWINGS

The present description will be better understood from the following detailed description read in light of the accompanying drawings, wherein:

FIG. 5C illustrates an example of a parsed response from the enterprise authorship database that presents authorship scores and co-authorship scores;

FIG. 7 is an example flowchart illustrating a computer-implemented method of determining a favorite author of a UID;

FIG. 10 is an example flowchart illustrating a computer-implemented method of determining a favorite collaborator of a UID;

Corresponding reference characters indicate corresponding parts throughout the drawings. In FIGS. 1 to 12, the systems are illustrated as schematic drawings. The drawings may not be to scale. Any of the drawings may be combined into a single embodiment or example.

DETAILED DESCRIPTION

Figure 1:
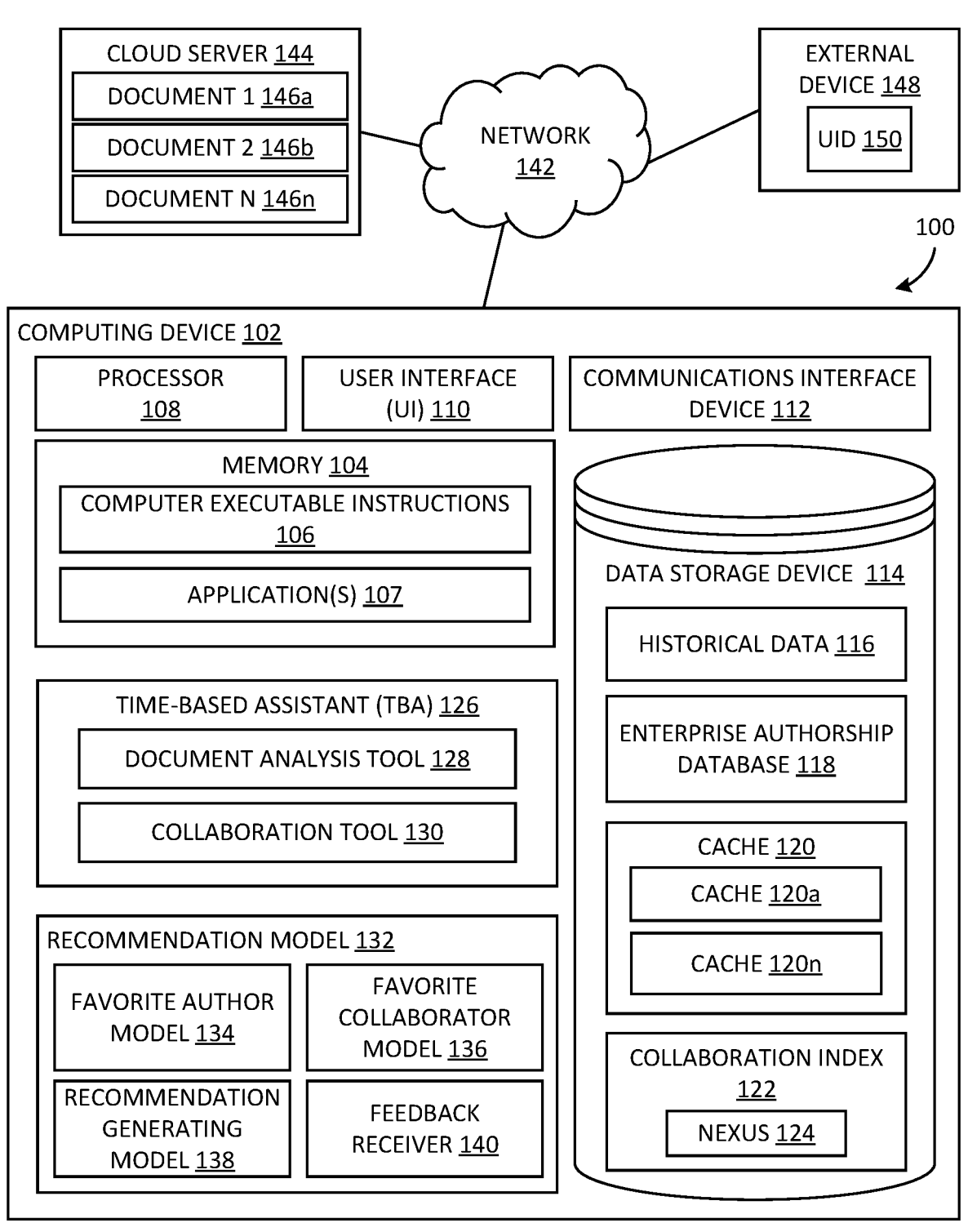
FIG. 1 is a block diagram illustrating an example system for inferring a favorite author.

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

As described herein, in an enterprise environment, a user spends a considerable amount of time accessing, viewing, and modifying various documents and/or files. In many instances, a single document is modified by multiple users who contribute to the final version of the document.

Some current solutions rely on metadata of a document in order to identify authors or creators of the file. However, metadata is not always available and, even when available, may be unreliable for use in determining authorship of the document or file. Thus, aspects of the disclosure provide enterprise solutions for inferring favorite authors and collaborators of a user, particularly where document metadata is unavailable or unreliable. The systems and methods described herein identify a document or file, or documents and files, accessed by a user, determine the contributors of the accessed document(s) and/or file(s), determine which of the contributors have contributed to the document significantly enough to be considered an author, determine whether the user is one of the authors, and use this authorship data to infer the user's favorite authors (i.e., other users that create content the user frequently accesses), and favorite collaborators (i.e., other users with which the user frequently collaborates). A trained machine learning (ML) model generates recommendations based on the determined favorite authors and collaborators, such as additional documents that may be of interest to the particular user or prompts to initiate additional collaboration with other users.

The system provided in the present disclosure provides a technical solution and operates in an unconventional manner at least by providing a trained ML model that generates recommendations for a user based on the inferred favorite authors and/or favorite collaborators of the user using on analysis conducted on enterprise data. The favorite authors and collaborators are inferred based on the analysis of generated authorship records, which are generated by transforming enterprise signal data for a particular document into contribution scores for each contribution and then determining which contributors have contributed significantly enough to the level that they are considered an author of the document. An authorship index is generated to store the generated authorship records, which facilitates an improved process of information storage, retrieval, and processing by the recommendation model by providing a centralized location for authorship records utilized by the recommendation model to infer favorite authors or collaborators of a particular user. The present disclosure further provides improved user interaction with the system by more precisely identifying the authors and collaborators the user most often interacts with, as well as improving the reliability of the system by providing more relevant recommendations.

FIG. 1 is a block diagram illustrating a system for inferring a favorite author. The system 100 illustrated in FIG. 1 is provided for illustration only. Other examples of the system 100 can be used without departing from the scope of the present disclosure.

The system 100 includes a computing device 102, a cloud server 144, and an external device 148. Each of the computing device 102, the cloud server 144, and the external device 148 are communicatively coupled to and communicate via a network 142. The computing device 102 represents any device executing computer-executable instructions 106 (e.g., as application programs, operating system functionality, or both) to implement the operations and functionality associated with the computing device 102. The computing device 102, in some examples, includes a mobile computing device or any other portable device. A mobile computing device includes, for example but without limitation, a mobile telephone, laptop, tablet, computing pad, netbook, gaming device, wearable device, Internet of Things (IoT) device, and/or portable media player. The computing device 102 can also include less-portable devices such as servers, desktop personal computers, kiosks, IoT devices, or tabletop devices. Additionally, the computing device 102 can represent a group of processing units or other computing devices. In some examples, the computing device 102 is a device executed in the cloud.

In some examples, the computing device 102 includes a memory 104 that includes the computer-executable instructions 106, a processor 108, and a user interface (UI) 110. The processor 108 includes any quantity of processing units, including but not limited to CPU(s), GPU(s), and NPU(s). The processor 108 is programmed to execute the computer-executable instructions 106. The computer-executable instructions 106 may be performed by the processor 108, performed by multiple processors 108 within the computing device 102, or performed by a processor external to the computing device 102. In some examples, the processor 108 is programmed to execute computer-executable instructions 106 such as those illustrated in the figures described herein, such as FIGS. 2-11. In various examples, the processor 108 is configured to execute one or more of the time-based assistant (TBA) 126 and the recommendation model 132 as described in greater detail below. In other words, the TBA 126 and the recommendation model 132, and their respective sub-components described in greater detail below, are implemented on and/or by the processor 108.

The memory 104 includes any quantity of media associated with or accessible by the computing device 102. The memory 104 in these examples is internal to the computing device 102, as illustrated in FIG. 1. In other examples, the memory 104 is external to the computing device 102 or includes memory components both internal and external to the computing device 102. The memory 104 stores data, such as the computer-executable instructions 106 and one or more applications 107. The applications 107, when executed by the processor 108, operate to perform various functions on the computing device 102. The applications 107 can communicate with counterpart applications or services, such as web services accessible via the network 142. In an example, the applications 107 represent downloaded client-side applications that correspond to server-side services executing in a cloud, such as the cloud server 144.

The user interface 110 includes a graphics card for displaying data to a user and receiving data from the user. The user interface 110 can also include computer-executable instructions, for example a driver, for operating the graphics card. Further, the user interface 110 can include a display, for example a touch screen display or natural user interface, and/or computer-executable instructions, for example a driver, for operating the display. In some examples, the touch screen display of the user interface 110 enables the user to select a network protocol to utilize for executing cross-device communication, as described in greater detail below. The user interface 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The computing device 102 further includes a communications interface device 112. The communications interface device 112 includes a network interface card and/or computer-executable instructions, such as a driver, for operating the network interface card. Communication between the computing device 102 and other devices, such as but not limited to the cloud server 144, can occur using any protocol or mechanism over any wired or wireless connection. In some examples, the communications interface device 112 is operable with short range communication technologies such as by using near-field communication (NFC) tags.

The computing device 102 further includes a data storage device 114 for storing data, such as, but not limited to historical data 116, an enterprise authorship database 118, a cache 120, and a collaboration index 122. The data storage device 114 in some non-limiting examples includes a redundant array of independent disks (RAID) array.

The data storage device 114, in this example, is included within the computing device 102, attached to the computing device 102, plugged into the computing device 102, or otherwise associated with the computing device 102. In other examples, the data storage device 114 includes a remote data storage accessed by the computing device 102 via the network 142, such as a remote data storage device, a data storage in a remote data center, or a cloud storage.

The historical data 116, the enterprise authorship database 118, the cache 120, and the collaboration index 122 are generated and maintained by the TBA 126, as described in greater detail below. For example, the historical data 116 includes a timestamp indicating a time at which a particular document was accessed by a particular UID, an indication of a length of time associated with the document access or interaction by each of the one or more contributors, a list of modified content within the document by each of the one or more contributors, a number of comments inserted into the document by each of the one or more contributors, the content of the comments inserted into the document by each of the one or more contributors, the number of comments associated with a particular UID inserted into the document by each of the one or more contributors, and an indication of a particular contributor of the one or more contributors that created the document. In some examples, the indication of the particular contributor is also flagged on the particular UID within historical data 116 of a particular contributor to indicate the documents which the UID has contributed to. The TBA 126 obtains access data, such as the access data 204 received via the indication 202 described in greater detail below, for a particular document, stores the access data 204 in the data storage device 114 as the historical data 116, and uses the historical data 116 to determine one or more authors of the document. Accordingly, the data storage device 114 may store respective historical data 116 for a plurality of different documents at a time.

It should be understood that as referenced herein, a document refers to any type of electronic file that is accessible and modifiable by a user. In various examples herein, the document may be a text-based document, a spreadsheet, a presentation, a slide deck, an audio file, a video file, a video and/or audio conferencing file, an electronic mail (email) document, a chat file, and so forth. The document may be one of the documents 146a-146n stored on the cloud server 144.

Figure 2:
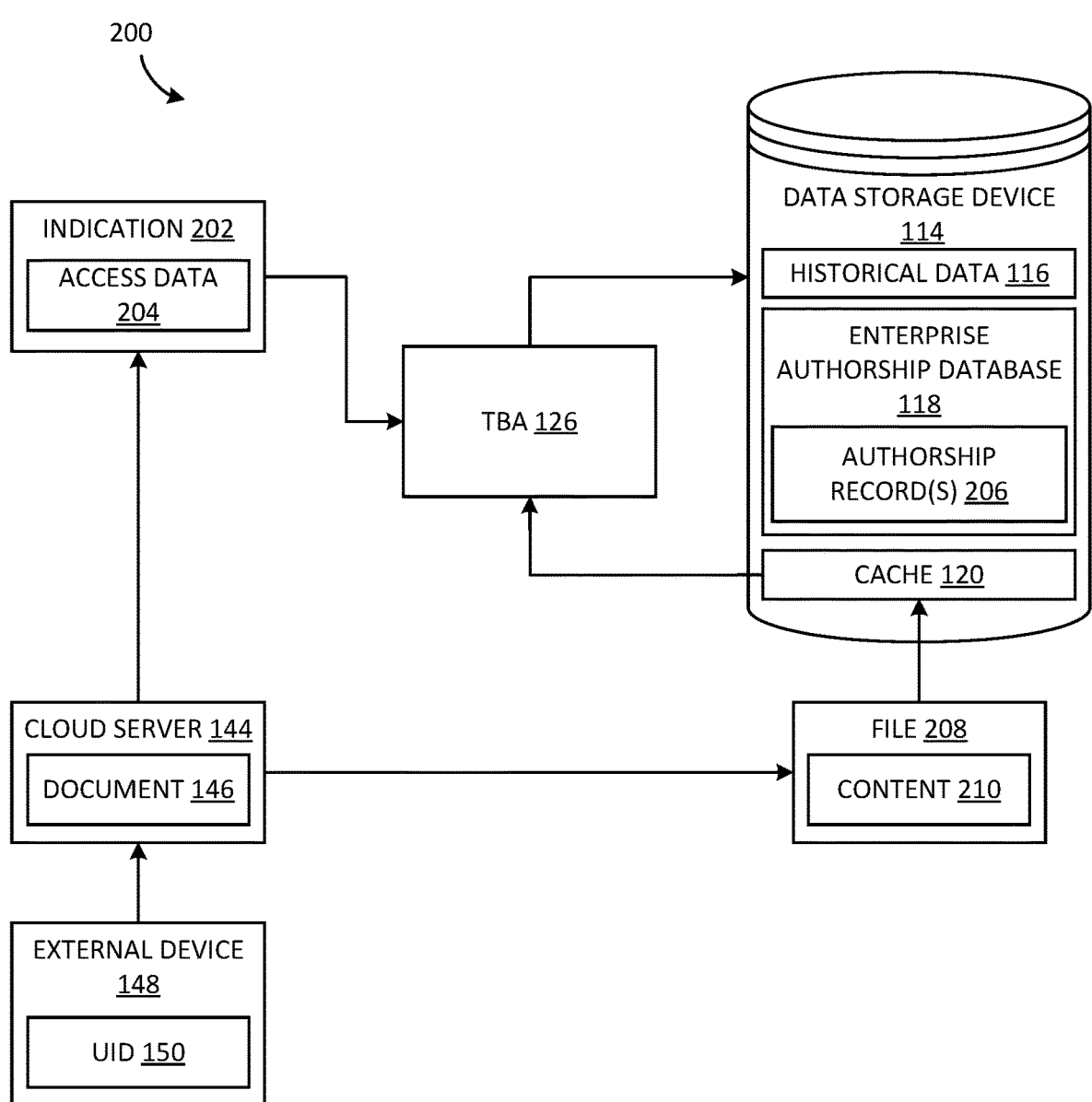
FIG. 2 is a block diagram illustrating an example system for inferring a favorite author.

The enterprise authorship database 118 is a database that includes an authorship record, such as the authorship record 206 illustrated in FIG. 2, for each document that has been triggered for analysis by the TBA 126 and accordingly has historical data 116 stored on the data storage device 114. For example, for each document, the enterprise authorship database 118 includes an identifier for the document, such as a document ID, a record ID, and so forth, and an authorship record associated with the document that includes at least one user identifier (UID) that identifies the user(s) determined to be an author (or co-authors) of the document. In some examples, the UID is a predetermined identifier associated with the user, such as an enterprise user ID. It should be understood that the association between a particular UID and a particular document is non-exclusive. For example, the authorship record for a single document may include multiple UIDs, such as where the document is determined to have multiple authors. In another example, a single UID is associated with multiple documents, such as where the user associated with the UID is determined to be an author of each of the multiple documents. In some examples, the enterprise authorship database 118 is generated by the TBA 126, each authorship record is generated, or created, by the TBA 126, and the TBA 126 uses the generated authorship records to identify a relationship between a UID that accessed the document and the one or more determined authors of the document. The recommendation model 132 uses the identified relationship to generate a recommendation for the user associated with the UID. In some examples, the recommendation is to view an additional document authored by the determined author or authors of the document accessed. In some examples, the recommendation is to initiate contact with the determined author, such as by presenting a link to send an electronic message to the author or presenting a link to a calendar invite to schedule a meeting with the author.

The cache 120 stores a working set of documents that have been recently accessed or modified by a UID. The data storage device 114 stores a separate cache 120a-120n associated with each UID in the enterprise system. For example, a first cache 120a is stored for a first UID, a second cache 120n is stored for a second UID, and so forth. Each cache 120a-120n is updated at regular intervals by the TBA 126 and stores the working set of documents for a particular period of time. In some examples, the cache 120 stores a working set of documents for one week, i.e., all the documents a particular UID has accessed or modified within the last week. In other example, the cache 120 may store a working set of documents for two weeks, three weeks, or one month. In some examples, the cache 120 updates every twenty-four hours. In other examples, the cache 120 may update every forty-eight hours, every seventy-two hours, or every week. The example time periods are provided for illustrative purposes and are not meant to limit the scope of the disclosure in any way.

The collaboration index 122 is generated and maintained by the TBA 126. The collaboration index 122 includes a nexus 124 between different UIDs, such as a first UID and a second UID, that identifies and quantifies a collaboration relationship between the first UID and the second UID. For example, a nexus 124 is identified between the first UID and the second UID when the first UID and the second UID are identified as common authors of a particular document. In some examples, the nexus 124 includes a collaboration score that quantifies the strength of the relationship between the first UID and the second UID. The strength of the relationship between the first UID and the second UID is quantified based on various factors, including but not limited to the number of documents authored by each of the first UID and the second UID, the recency of the authorship of the documents authored by each of the first UID and the second UID, a frequency of collaboration between the first UID and the second UID. For example, a first nexus that is identified based on a single document authored by each of the first UID and the second UID is weaker than a second nexus that is identified based on ten documents authored by each of the first UID and a third UID. Similarly, a first nexus that is identified based on a single document authored by each of the first UID and the second UID one month ago is weaker than a second nexus that is identified based on a document authored by each of the first UID and a third UID one week ago.

The TBA 126 includes a document analysis tool 128, and a collaboration tool 130. The document analysis tool 128 identifies and analyzes the interaction between a UID and a document or file to identify at least one author of the identified document. The document analysis tool 128 receives an indication, such as the indication 202 illustrated in FIG. 2 and described in greater detail below, from the cloud server 144 that one of the documents 146a-146n has been created or accessed. The received indication includes additional information, such as the access data 204 illustrated in FIG. 2 and described in greater detail below, regarding the document being created or accessed. The access data 204 is extracted by the document analysis tool 128 and stored in the data storage device 114 as the historical data 116. For example, the access data 204 includes the UID that accessed the document, how long the UID interacted with the document during the access period, whether modifications and/or comments were made to the documents during that access period and, if so, a list of the modifications and/or comments, and so forth. In some examples, the indication from the cloud server 144 is received in real time. In other words, the indication is received from the cloud server 144 as soon as the document is created or accessed, or as soon as the UID ceases to access the document. In other examples, a single indication is sent from the cloud server 144 to the document analysis tool 128 at a predetermined time of day that includes a list of all the documents created or accessed since a previous indication was sent and all the information regarding each document that is then stored as the historical data 116. The received indication may include varying levels of detail regarding the access to the document. In some examples, an indication is received that includes data regarding how long the document was accessed, including time stamps indicating a time the document was opened and a time the document was closed. In other examples, one indication is received including a time-stamp indicating the document was opened and another indication is received including a timestamp indicating the document was closed. The TBA 126 then calculates the period of time that the UID accessed the document based on a time difference between when the document was opened and when the document was closed.

The document analysis tool 128 determines one or more contributors to a particular document included in the received indication. For example, based on the obtained historical data extracted from the received indication, the document analysis tool 128 determines that the identified document has a plurality of versions and at least one contributor. The plurality of versions includes at least two versions, i.e., a first version and a final version, but may include more than two versions, i.e., at least one interme-diate version between the first version and the final version. The at least one contributor is a UID that made at least one modification to generate the final version from the first version or the intermediate version, or the intermediate version from the first version. For each version of the document, the document analysis tool 128 calculates a version contribution score for each contributor to the docu-ment, which measures the contribution of a particular con-tributor to that version. The version contribution scores of each version are then combined to generate an overall contribution score for each contributor, which measures the contribution of a particular contributor to the document as a whole.

In one example, the document analysis tool 128 deter-mines that a document has two versions, a first version and a final version, and two contributors, a first contributor and a second contributor. For the first version, the document analysis tool 128 generates a first version contribution score for each of the first contributor and the second contributor, and for the second version, the document analysis tool 128 generates a second version contribution score for each of the first contributor and the second contributor. In another example, the document analysis tool 128 determines the quantity of edits to the document to determine a contribution score for each contributor. For example, where, for a final version of the document, a first author contributed ninety characters to the document and a second author contributed ten characters to the document, the contribution score of the first author is weighted higher than the contribution score of the second author. As noted above, the respective version contribution scores measure the contribution of each con-tributor to the respective versions of the document. The document analysis tool 128 generates an overall contribution score for the document for the first contributor and an overall contribution score for the document for the second contribu-tor. As noted above, the overall contribution score for the document for each contributor measures the contribution of the respective contributor to the document as a whole.

Each of the version contribution score and the overall contribution score may be expressed in various terms. In some examples, each of the version contribution score and the overall contribution score are expressed numerically from 0.0 to 1.0, where 0.0 indicates no contribution to the document and 1.0 indicates the contributor was the sole contributor to the document. In other examples, each of the version contribution score and the overall contribution score are expressed numerically from 0.0 to a value greater than 1.0, such as 5.0, 10.0, 100.0, and so forth.

In some examples, the contribution scores, i.e., the ver-sion contribution score and the overall contribution score, are generated based on percentages each contributor con-tributed to the document. For example, on a scale of 0.0 to 1.0, where each contributor contributed fifty percent of the words contained in the document, a contribution score of 0.5 would be generated for each contributor. In other examples, the contribution scores are generated based on assigning weights to different aspects of the historical data 116, such as in examples where the respective contributions include non-textual content such as a graphic, image, video, and so forth. For example, the historical data is weighted to priori-tize text-based modifications over image-based modifica-tions.

The document analysis tool 128 determines one or more authors of the respective document based on each generated contribution score. In some examples, the document analysis tool 128 determines the one or more authors of the respec-tive document by comparing the generated overall contri-bution of each contributor to a contribution threshold. The contribution threshold is set to distinguish a UID that, while a contributor to the document, did not make enough modi-fications to the document to be classified as an author, from a UID that made modification to the document that eclipse a threshold to be classified as an author. In some examples, the contribution threshold is a contribution score within the range of the scale of contribution scores. For example, where the contribution scores are expressed from 0.0 to 1.0, the contribution threshold for authorship may be 0.2, 0.3, 0.5, and so forth. Some documents may have a different contribution threshold for authorship than others. For example, a scholarly article for publication may have a higher contribution threshold for authorship than an internal presentation. In another example, one department within the enterprise system may have a higher contribution threshold for authorship than another department. In other examples, the contribution threshold for authorship may be manually set by the creator of the document.

In other examples, the document analysis tool 128 deter-mines the one or more authors of the respective document based on the assigned weights to each portion of the obtained access data. In these examples, the document analysis tool 128 determines the one or more authors based on the contribution scores which are generated based on the assigned weights to different aspects of the access data. For example, the document analysis tool 128 may identify a predefined number of authors based on the highest contri-bution scores for the document. Where the predefined num-ber of authors is three, the document analysis tool 128 identifies the three highest contribution scores for the docu-ment and selects the UIDs associated with the three highest contribution scores for the document as the authors. In another example, the document analysis tool 128 may iden-tify a predefined percentage of authors based on the highest contribution scores for the document. Where the predefined percentage of authors is the top twenty percent of contribu-tion scores, and there are ten identified contributors, the document analysis tool 128 selects the UIDs associated with the top two highest contribution scores for the document as the authors.

The document analysis tool 128 generates, or creates, an authorship record by associating the UID or UIDs of the determined author or authors, respectively, with the identified document. For example, a generated authorship record includes a document identifier, such as the document ID, and one or more UIDs associated with the author or authors of the document. In some examples, the authorship record includes a consumption score for each document associated with the UID. The consumption score is a measure of the level of consumption of the document. In various examples, the consumption score is based on an amount of time the UID spends consuming the document and/or an amount of content within the document that is consumed while the document is being accessed. The consumption score may be provided on a scale from 0.0 to 1.0, 0.0 to 5.0, 0.0 to 10.0, and so forth.

The document analysis tool 128 further generates and maintains the enterprise authorship database 118. The document analysis tool 128 generates the enterprise authorship database 118 to store authorship records based on the generation of the authorship record for a first document and updates the enterprise authorship database 118 as new authorship records are generated and existing authorship records are updated. For example, upon a determination that new consumption data associated with a given document ID or UID is made available, existing authorship records are updated in the enterprise authorship database 118 for the document ID and/or the UID. In some examples, the document analysis tool 128 generates the enterprise authorship database 118 that stores authorship records for documents accessed by a single UID. In this example, the enterprise authorship database 118 is generated in response to the UID accessing a first document. In other examples, the document analysis tool 128 generates the enterprise authorship database 118 that stores authorship records for documents accessed by more than one UID, such as all the UIDs associated with a particular department or the entire enterprise system. In this example, the enterprise authorship database 118 is generated in response to a first document being accessed. In examples where the enterprise authorship database 118 stores authorship records for more than one UID, the enterprise authorship database 118 is partitioned by UID such that the authorship records for documents accessed by each UID may be readily determined.

The document analysis tool 128 updates the enterprise authorship database 118 with the generated authorship record. In some examples, the document analysis tool 128 adds new authorship records to the enterprise authorship database 118. For example, where a first authorship record is generated for a new document, i.e., a document that does not previously include an authorship record in the enterprise authorship database 118, the document analysis tool 128 adds the generated authorship record to the enterprise authorship database 118. In some examples, the document analysis tool 128 updates a previously stored authorship record in the enterprise authorship database 118. For example, where an authorship record is generated or updated for a document that has an authorship record previously stored in the enterprise authorship database 118, the document analysis tool 128 updates the previously stored authorship record to include the updated information in the newly generated or updated authorship record. The document analysis tool 128 updates the previously stored authorship record through various ways. In some examples, the document analysis tool 128 deletes the originally stored authorship record from the enterprise authorship database 118 and adds the new authorship record to the enterprise authorship database 118. In other examples, the document analysis tool 128 removes information from the original authorship record that is inconsistent with the updated authorship record and replaces the removed information with the new information that has been included with the updated authorship record.

In some examples, the document analysis tool 128 updates the enterprise authorship database 118 in real time. For example, where the document analysis tool 128 receives the indication from the cloud server 144 in real time and queries the enterprise authorship database 118 to determine whether a previously created record for the document ID already exists. If the authorship record already exists, the document analysis tool 128 updates the stored authorship record by recalculating contribution weights, consumption, and so forth as described herein and updates the enterprise authorship database 118 in real time as the updated authorship record is generated. If the authorship record does not exist, the document analysis tool 128 generates a new authorship record and stores the new authorship record in the enterprise authorship database 118. In other examples, the document analysis tool 128 updates the enterprise authorship database 118 at a predetermined time. For example, where the document analysis tool 128 receives the indication from the cloud server 144 at a predetermined time and, accordingly, the document analysis tool 128 creates or updates the authorship record of each document contained in the received indication, the document analysis tool 128 updates the enterprise authorship database 118 at a predetermined time as the updated authorship record or records are generated.

The TBA 126 further includes a collaboration tool 130 that analyzes and determines collaboration levels between a first UID and other UIDs based on the authorship records created by the document analysis tool 128 and stored in the enterprise authorship database 118. For example, for a particular UID, the collaboration tool 130 identifies authorship records that indicate documents the UID has accessed and documents for which the UID is listed as an author. The collaboration tool 130 identifies other UIDs that are listed as authors on the same documents on which the first UID is listed as an author. Based on identifying the other UIDs, the collaboration tool 130 generates the collaboration index 122. The collaboration index 122 includes a nexus 124 between the first UID and other UIDs and identifies the other UIDs as a collaborator of the first UID. In some examples, the nexus 124 includes a collaboration intensity score between the first UID and each other UID that indicates an intensity, or strength, of collaboration over time between the first UID and each other UID.

The collaboration intensity score may be expressed numerically on a scale, for example from 0.0 to 1.0 or from 0.0 to 10.0, where a higher value indicates a greater collaboration intensity. The collaboration intensity score between the UID and another UID may be weighted to emphasize various factors. For example, the collaboration intensity scores may be weighted so that collaborators who have a greater collaboration score in the past week are given more weight than collaborators who have a lower contribution score in the past week.

In this example, where a second UID has a collaboration score of 0.6 with a first UID for the past week, but a 0.4 collaboration score with the first UID over the past four weeks, and a third UID has a collaboration score of 0.5 with the first UID for the past week and a 0.5 collaboration score with the first UID over the past four weeks, the collaboration intensity score between the first UID and the second UID is greater than the collaboration intensity score between the first UID and the third UID due to the higher weight placed on the most recent week.

The computing device 102 further includes a recommendation model 132. The recommendation model 132 includes one or more machine learning (ML) models. For example, the recommendation model 132 includes a favorite author model 134 that determines a favorite author for a particular UID, a favorite collaborator model 136 that determines a favorite collaborator for a particular UID, and a recommendation generating model 138 that generates one or more recommendations for a particular UID based on the favorite author determined by the favorite author model 134 and/or the favorite collaborator determined by the favorite collaborator model 136. In some examples, the recommendation model 132 and the TBA 126 are each implemented as specialized processing units on the processor 108. In another example, the recommendation model 132 is implemented on the TBA 126 as a component of the TBA 126. In yet another example, the recommendation model 132 is implemented on a separate computing device, such as the cloud server 144, the external device 148, or another device.

For a particular UID, the favorite author model 134 generates an authorship score for each author that has authored content consumed by the particular UID and, based on the generated authorship scores, generates a list, or ranking, of favorite authors for a particular UID over a particular period of time. For example, the favorite author model 134 may determine a ranking of favorite authors over time for the UID, taking into account all documents accessed by the UID in the historical data available, with the exception of documents of which that the UID is flagged as a contributor. In another example, the favorite author model 134 may determine favorite authors for the UID over a more specific period of time, such as the previous week, the previous two weeks, the previous four weeks, and so forth. It should be understood that the favorite author may be determined over any period of time. In some examples, the ranking of favorite authors is updated each time the TBA 126 is executed as described herein.

In examples where the favorite authors over time are determined for a UID, the favorite author model 134 analyzes the entirety of the generated authorship records for the UID that are stored in the enterprise authorship database 118 to generate an authorship score corresponding to each author listed in the generated authorship records. In some examples, the authorship score is generated by combining document consumption and authorship of the consumed documents. For example, the consumption of a document is multiplied by the determined author or authors of the consumed document, and then a sum of these results for all consumed documents are computed to determine an authorship score. This is performed for each author of a document that has been consumed by the UID. The authorship scores are then ranking in the generated list of favorite authors from highest authorship score to lowest authorship score.

In some examples, the favorite author model 134 aggregates or weights the authorship scores based on aggregate percentage or maximum weight for a particular document or type of document. In one example, authorship scores are weighted so that authors who have a greater contribution score for a particular document are given more weight than authors who have a lower contribution score for the particular document. In this example, where a first author has a contribution score of 0.6 for two documents and a second author has a contribution score of 0.4 for each of the same two documents, the generated authorship score for the first author is higher than the generated authorship score for the second author. In other examples, authorship scores are weighted to place a greater emphasis on authors of a greater number of documents accessed by the UID, even if the individual contribution scores may be less. In this example, where a first author has a contribution score of 0.7 for each of two documents, but no contribution on any other documents, and a second author has a contribution score of 0.3 for ten documents, the generated authorship score for the second author is higher than the generated authorship score for the first author. The generated authorship scores and the generated list, or ranking, of favorite authors is then propagated to the enterprise authorship database 118 and to the respective cache 120 for the UID.

The present disclosure recognizes and takes into account challenges faced by determining a ranking of favorite authors ever for a particular UID, in particular because data may not be available after a certain period of time. For example, consumption data may not be available for more than one month, two months, three months, six months, and so forth. In these examples, prior to consumption data being overwritten or deleted to make storage space available for new, incoming consumption data, the favorite author model 134 stores an aggregate authorship percentage and/or a maximum weight for each author listed in the generated authorship records for the particular UID.

Where the ranking of favorite authors over a period of time is determined for a UID, the favorite author model 134 analyzes the generated authorship records for the UID that are stored in the enterprise authorship database 118 for only the period of time to generate an authorship score corresponding to each author listed in the generated authorship records. For example, where the lookback period is two weeks, the favorite author model 134 analyzes the generated authorship records for the UID from the previous two weeks that are stored in the enterprise authorship database 118 to generate an authorship score corresponding to each author listed in the generated authorship records and then generates a ranking that lists the authors in order from highest authorship scores to lower authorship scores. Similar to examples where the favorite author is determined, the favorite author model 134 aggregates or weights the authorship scores based on aggregate percentage or maximum weight for a particular document or type of document. In addition to or instead of the examples presented above, where authorship scores are weighted so that authors who have a greater contribution score for a particular document are given more weight than authors who have a lower contribution score for the particular document or where authorship scores are weighted to place a greater emphasis on authors of a greater number of documents accessed by the UID, the favorite author model 134 may implement a time decay to bias the favorite authorship scores in favor of authors of documents that have been accessed more recently. For example, where the UID has accessed documents authored by a first author in the past week and has not accessed documents authored by a second author in the past week, the favorite author model 134 generates a higher authorship score for the first author than the second author.

The ranking of favorite authors over a particular period of time may be updated dynamically. For example, when looking back over one week, two weeks, three weeks, four weeks, and so forth, the authorship scores are updated dynamically, such as every week or even every day. In some examples, the TBA 126 is updated each day and, accordingly, the favorite author model 134 is triggered to execute each day to update the authorship scores of the authors of the documents accessed by the UID within the set period of time. In other examples, the TBA 126 is updated weekly and, accordingly, the favorite author model 134 is triggered to execute each day to update the authorship scores of the authors of the documents accessed by the UID within the set period of time.

In some examples, during each execution of the favorite author model 134, the favorite author model 134 generates a histogram for the set period of time. The histogram is used to more accurately compute a time decaying function to create a common authorship score and/or weight. The generated histogram may be stored in the data storage device 114.

The determination of favorite authors is aggregated per person based on various metrics, including but not limited to an authorship percentage over a predetermined period of time such as one week, two weeks, three weeks, four weeks, and so forth, weighted to favor more heavily authors of documents accessed in the most recent period of time, such as one week, two weeks, three weeks, four weeks, and so forth, and a favorite author weight. For example, a favorite author score may be expressed as the sum of each weighted contribution score. This is expressed in Equation 1, below, where a first weight (weight_1) is multiplied by the authorship score of a first document (AS1), a second weight (weight_2) is multiplied by the authorship score of a second document (AS2), a third weight (weight_3) is multiplied by the authorship score of a third document (AS3), and so forth. The product of each weight multiplied by authorship score are added together to generate a weighted favorite author score.

$$FA\ Weight=weight\_1*(AS1)+weight\_2*(AS2)+\\ weight\_3*(AS3)+weight\_n*(ASn) \qquad \text{Equation 1}$$

Accordingly, a particular author may be listed as a favorite author for a UID for a period of time, such as while the user associated with the UID is working on a particular project, investigating a new feature, and so forth, but then gradually become less and less of a favorite as the user consumes less of the information due to a change in project or having learned the new feature.

The favorite collaborator model 136 determining additional UIDs with which a particular UID collaborates with a greatest frequency or intensity. The favorite collaborator model 136 identifies each document for which the UID is listed as an author. The favorite collaborator model 136 generates a list of each additional UID listed as an author of the identified documents and generates a collaboration intensity score between the UID and each of the additional UIDs. The collaboration intensity score measures a strength of the collaboration between the UID and another UID.

For a particular UID, the favorite collaborator model 136 generates a collaboration score for each collaborator with the UID and, based on the generated collaboration scores, generates a list, or ranking, of favorite collaborators for a particular UID over a period of time. For example, the favorite collaborator model 136 may determine a ranking of favorite collaborators historically for the UID, taking into account all documents for which the UID is listed as an author over the set period of time. In some examples, the favorite collaborator model 136 considers all the documents for which the UID is determined to be an author and subsequently all other UIDs who were also determined to be an author of those documents. The generated collaboration score is computed by estimating the authorship score of the UID multiplied by the authorship score of each other author for a particular document and then compute a summed score across all documents for which the UID is an author. In some examples, the generated collaboration score is time decayed based on when the edits were performed in the respective document so that more recent edits are weighted to indicate a higher collaboration score than edits performed less recently. The generated collaboration scores and the generated list, or ranking, of favorite collaborators is then propagated to the enterprise authorship database 118 and to the respective cache 120 for the UID.

In some examples, the favorite author model 134 and the favorite collaborator model 136 operate exclusively of each other. Where a UID is identified as an author of a particular document, that document is excluded from being used in the determination of a favorite author. Including documents which the UID has contributed to at a significant enough level to be classified as an author of would skew the determination of favorite authors of the UID, so these documents are not considered by the favorite author model 134.

The recommendation generating model 138 uses the data generated by the favorite author model 134 and the favorite collaborator model 136 and stored in the respective cache 120 of the UID to generate a recommendation that is presented to the UID. The recommendation generating model 138 filters the generated ranking of favorite authors to remove the authors which the favorite collaborator model 136 has determined the UID collaborates, or interacts, with, leaving only those authors with whom the UID has a passive relationship that has historically included no or very little interaction with. In other words, because the UID consumes content of these remaining authors but has not interacted with these authors or has interacted very little with these authors, the recommendation generating model 138 identifies the remaining authors as likely producing additional content that would be of interest and value to the UID. The generated ranking may be filtered in various ways. In one example, the enterprise authorship database 118 is called once, where the rankings of favorite authors and collaboration intensity scores are pulled for all UIDs included in the ranking of the favorite authors, and then filtered to remove authors for which the UID also has a collaboration intensity score. In another example, the enterprise authorship database 118 is called twice. In a first instance, the ranking of favorite authors is obtained, and in a second instance any part of the favorite authors properties including a collaboration intensity score or a filter, such as a Boolean filter, indicating a prior interaction with the favorite author is pulled. The ranking of favorite authors is then filtered to remove the UIDs associated with the data obtained in the second instance. In some examples, the recommendation generating model 138 utilizes a machine-learning (ML) model and/or artificial intelligence (AI) to generate a recommendation or more accurately predict and determine weightings of different factors for authorship based on the determined favorite authors and/or favorite collaborators. In some examples, recommendation generating model 138 may generatively answer input queries, such as "who authored this document?" or "which people have impacted the content I am currently consuming" or "which contributors have influenced me", etc.

In some examples, the generated recommendation is a recommendation to view an additional document or documents that have an author identified as one or more highly ranked favorite authors, but have not been accessed by the UID. In other examples, the generated recommendation is a recommendation to connect with one or more of the highly ranked favorite authors. For example, the generated recommendation may include a prompt presented on the UI 110 that, when selected, opens an application 107 to communicate with the favorite author. The opened application 107 may be an email application to send a message to the favorite author, a calendar application to schedule a meeting with the favorite author, and so forth. In another example, the generated recommendation is a recommendation to follow a particular author on an enterprise feed. For example, the enterprise feed presents content from various different authors. Authors that the UID follows are presented at a greater frequency on the enterprise feed than authors the UID does not follow. In another example, the generated recommendation is a recommendation to present, in the enterprise feed, content and/or activities from authors the UID follow. However, it should be understood that the examples presented herein are for illustration only and should not be construed as limiting. The generated recommendation may include, but is not limited to, one or more examples presented herein.

In some examples, the recommendation generating model 138 incorporates data from sources other than the data generated by the favorite author model 134 and the favorite collaborator model 136 in generating a recommendation. For example, the recommendation generating model 138 obtains additional enterprise data for a particular UID, including attendance in meetings, virtual meetings such as conference and video calls, and so forth, that is included in the model to generate a recommendation. For example, where another UID frequently appears in the same meetings as a UID but has a relatively low collaboration score, the recommendation generating model 138 factors the frequent attendance in the same meetings in order to generate a recommendation that the UID collaborates with the another UID.

The recommendation generating model 138 further uses the generated ranking of favorite collaborators generated by the favorite collaborator model 136 to generate a recommendation that is presented to the UID. In some examples, the generated recommendation is a recommendation to further collaborate with another UID listed as a top collaborator. In another example, the generated recommendation is a recommendation to reconnect or collaborate with another UID whose position in the generated ranking has fallen over time. In other words, the recommendation generating model 138 compares a present version of the generated ranking to a previous version or versions of the generated ranking and identifies the other UID that was higher in a previous version of the generated ranking than in the present version of the generated ranking. This indicates a decrease in collaboration from the UID to the other UID and the generated recommendation to the UID is to initiate additional, or renewed, collaboration with the other UID.

The recommendations generated by the recommendation generating model 138 are stored in the data storage device 114 along with the generated rankings of favorite authors and favorite collaborators, such as in the respective cache 120 for the UID. In some examples, the recommendation model 132 uses previous iterations of generated recommendations, favorite authors, and favorite collaborators to continually improve the recommendation generating model 138. For example, the recommendation generating model 138 may look back a period of time, such as three months, and take the data from the lookback period as an input to generate the rankings of favorite authors and favorite collaborators. The recommendation model 132 further analyzes the accuracy of the generated recommendations. In one example, the recommendation model 132 receives, via a feedback receiver 140 implemented on the recommendation model 132, looks back using a shorter lookback period, such as one month, to determine whether the prediction was correct. In determining whether the prediction was correct, the recommendation model 132 removes the time decay aspect and focuses on whether if the month after, the UID accessed the documents from the same authors. In another example, the recommendation model 132 executes an internal refinement that generates a request to solicit feedback on the generated favorite author list, such as from the UID via the UI 110. In another example, the recommendation model 132 executes A/B testing with an old and new feed ranking model to determine whether the metrics improve when the generated list of favorite authors is used as one of the inputs. That is, the ranking model may be improved based on user interaction following a generated recommendation, i.e., if the UID interacts with items related to the favorite authors identified, this will reinforce the importance of the favorite authors identified in the recommendation model.

Based on the received feedback, the recommendation generating model 138 is trained. For example, feedback may be received responding to a recommendation to view an additional document authored by a favorite author that indicates the additional document was viewed is used a positive reinforcement for the recommendation model 132 to recommend other documents for authors that have a similar favorite score for the UID. In contrast, feedback received that indicates the additional document was not viewed is used as negative reinforcement and in a next iteration of the recommendation generating model 138, a document from a favorite author having a higher favorite score for the UID is recommended.

Accordingly, executing the recommendation generating model 138 includes a feedback loop that includes generating a recommendation for a particular UID, outputting the generated recommendation to a display of a GUI associated with the UID, receiving feedback, via the feedback receiver 140, from the UID regarding the generated recommendation, and updating the recommendation generating model 138 to further improve the model and further customize the recommendations that are generated for a particular UID so that over time, the generated recommendations become increasingly more relevant to the UID. In other words, the recommendation generating model 138 is customized and trained respective to a particular UID so that the generated recommendation to view a document, collaborate with another UID, and so forth are increasingly relevant to what the UID indicates is pertinent based on previous feedback provided via the feedback receiver 140.

In some examples, the TBA 126 and/or the recommendation model 132 are leveraged, or implemented, by an artificial intelligence service, such as an artificial intelligence assistant or generative AI systems. For example, the artificial intelligence service receives an input that asks to identify who authors, is working on, and/or influencing the documents consumed by a particular UID. The artificial intelligence service obtains the generated ranking of the favorite authors or the generated ranking of the favorite collaborators from the cache 120 associated with the UID to use at least in part to generate an answer to the received input. In another example, the artificial intelligence service receives an input that asks who authored a particular document presently being consumed. The artificial intelligence service obtains the authorship record from the enterprise authorship database 118 to use at least in part to generate an answer to the received input.

In some examples, the external device 148 is a device, or devices, implemented by a UID 150 to access one or more of the documents 146a-146n stored on the cloud server 144 via the network 142. For example, as described herein, the external device 148 may be a mobile electronic device, a laptop, a tablet, a wearable device, an augmented reality (AR) or virtual reality (VR) device, or any other suitable device for accessing one or more of the documents 146a-146n stored on the cloud server 144.

The cloud server 144 stores one or more documents, such as the first document 146a, the second document 146b, and so forth through the nth document 146n. As described herein, each of the documents 146a-146n may be a text-based document, a spreadsheet, a presentation, an audio file, a video file, an electronic mail (email) document, and so forth. However, it should be understood that these examples should not be construed as limiting. The documents 146a-146n may be any type of document or file having one or more authors, or collaborators, that created or contributed towards content that collectively comprises the respective document.

Software implemented on the cloud server 144 further monitors access of each of the documents 146a-146n. For example, each iteration of a document being accessed by a UID is logged with a timestamp including the time of access, which document was accessed, and how long the document was accessed. In response to determining that one of the documents 146a-146n has been accessed, the cloud server 144 determines a UID 150 that has accessed the document 146a-146n. In some examples, the cloud server 144 determines the UID 150 by identifying an account that has accessed the document 146a-146n and mapping the identified account to a UID 150, such as by cross-referencing the account or an internet protocol (IP) address associated with the account with a list of UIDs in the enterprise system. By determining the UID 150 that accessed the document 146a-146n, the cloud server 144 takes into account that a single UID 150 may access documents 146a-146n from more than one device, such as a mobile electronic device, a laptop, a tablet, a wearable device, an AR or VR device, and so forth, and that for the purpose of determining a favorite author or favorite collaborator, the particular device used to access the document is less material than the UID 150 which accessed the document.

In response to the trigger event, such as a particular time of day, the document analysis tool 128 identifies which of the documents 146a-146n have been accessed since the previous iteration of the TBA 126, which UID 150 accessed the document, and access data including a timestamp associated with the UID 150 indicating when the document was accessed, a timestamp associated with the UID 150 indicating when the document was closed, how long the document was accessed, whether content in the document was modified, and if content was modified, a list of modifications to the content. The access data is then stored in the data storage device 114 as the historical data 116. In some examples, once a document has been closed, i.e., the UID 150 has ceased accessing the document, the cloud server 144 generates the access data and sends the access data to the document analysis tool 128. In other examples, the document analysis tool 128 receives a single indication at a predetermined time, or interval, that includes a record of access data for each document that has been accessed by a UID 150 since the previous indication was received. The predetermined time or interval may be once a day, twice a day, once every hour, and so forth. In other words, the document analysis tool 128 may receive a single indication each day that includes access data of each document 146a-146n that has been accessed by each UID 150 in the past day.

FIG. 2 is a block diagram illustrating an example system for inferring a favorite author. The system 200 illustrated in FIG. 2 is provided for illustration only. Other examples of the system 200 can be used without departing from the scope of the present disclosure.

The system 200 illustrates an implementation for inferring a favorite author for a particular UID 150. The UID 150 accesses a document 146, i.e., one of the documents 146a-146n, that is stored on the cloud server 144 via an external device 148. In response to a trigger event, the TBA 126 receives an indication 202 from the cloud server. The indication 202 includes access data 204. In some examples, the trigger event is the UID 150 closing the document 146, i.e., ceasing to access the document 146, which triggers the cloud server 144 to generate the access data 204 and send the indication 202 including the access data 204 to the TBA 126. In another example, the trigger event is a predetermined interval or time of day being reached, where at a predetermined interval the cloud server 144 transmits access data 204 to the TBA 126 via the indication 202. In this example, the access data 204 includes access data associated with each document 146 that has been accessed by a UID 150 since the previous indication 202 was received by the TBA 126. As described herein, the access data 204 includes access information describing a time at which the document was accessed, how long the document was accessed, whether content in the document was modified, and if content was modified, a list of modifications to the content.

The TBA 126 receives the indication 202, including the access data 204, from the cloud server 144 and executes each of the document analysis tool 128, document analysis tool 128, and collaboration tool 130 as described herein. In other words, the document analysis tool 128 creates an authorship record 206 for each document 146 for which access data 204 is received, the document analysis tool 128 generates and/or updates the enterprise authorship database 118 with the created authorship record or records 206, and the collaboration tool 130 generates a collaboration intensity score for each document 146 for which access data 204 is received and the UID 150 is determined to be a contributor of. The TBA 126 stores the raw access data 204 in the data storage device 114 as historical data and stores the created authorship records 206 in the enterprise authorship database 118.

The TBA 126 further receives a file 208, which is a copy of the accessed document 146 that was accessed or modified by the UID 150. The file 208 is stored in the cache 120, which, as described herein, stores a working set of documents that have been recently accessed or modified by a UID 150. The cache 120 is associated with a particular UID 150 and updated at regular intervals and stores the working set of documents for the UID 150 for a particular period of time. In other words, a cache 120 for a particular UID 150 stores a local copy of all the documents accessed or modified by the UID 150 within a period of item, such as one week, two weeks, and so forth. The file 208 includes content 210, such as text, images, videos, audio, and so forth depending on the type of document 146 the file 208 is based on. For example, a video file includes video content and, in some examples, audio content. A spreadsheet document includes text content and may include graphs, charts, images, and so forth as additional content. In some examples, the content 210 further includes a list of the modifications made to the document 146 when accessed by the UID 150. For example, the list of modifications may include indications of text the UID 150 added to the document 146 and a time at which the text was added, indications of text the UID 150 removed from the document 146 and a time at which the text was removed, indications of an image the UID 150 added to the document 146 and a time at which the image was added, indications of an image the UID 150 removed from the document 146 and a time at which the image was removed, comments added to or removed from the document 146 by the UID 150, and so forth.

Figure 3:
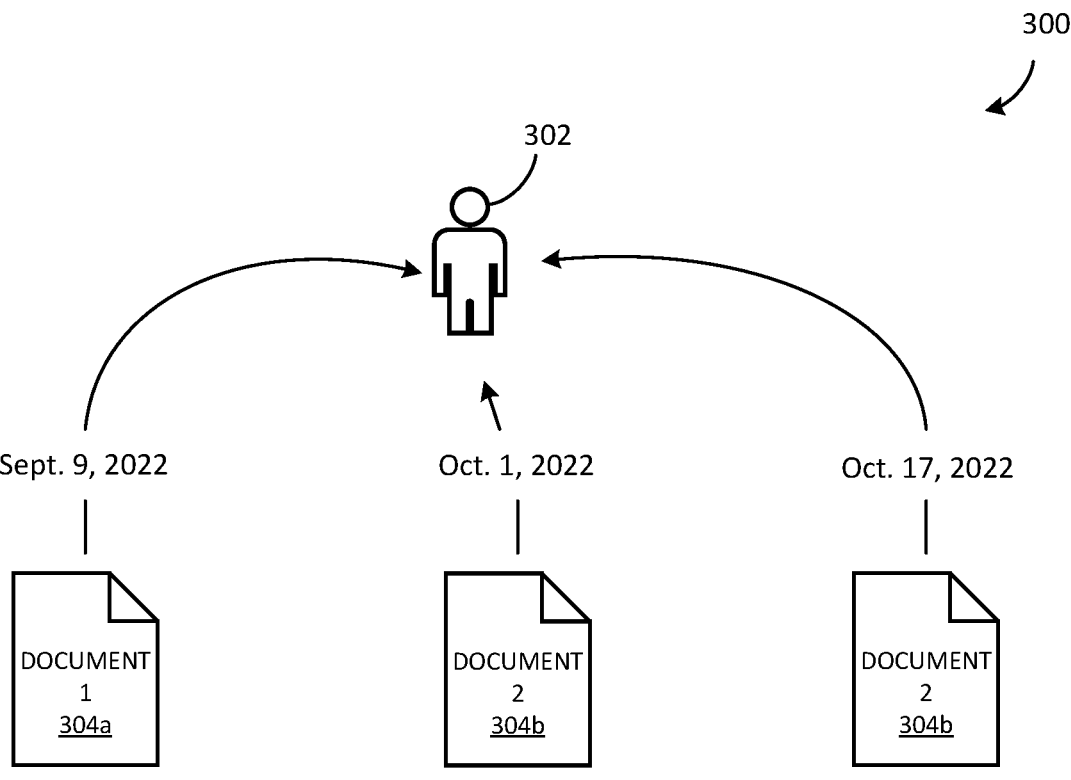
FIG. 3 is an example timeline of consumption of a document.

FIG. 3 is an example timeline of consumption of documents. The timeline 300 illustrated in FIG. 3 is provided for illustration only. Other examples of the timeline 300 can be used without departing from the scope of the present disclosure.

FIG. 3 illustrates a UID 302. The UID 302 is associated with a user that accesses documents via one or more external devices 148. The timeline 300 illustrates the UID 302 accessing a first document 304a at a first time and accessing a second document 304b at a second time and a third time. In particular, FIG. 3 illustrates the UID 302 accessing the first document 304a on Sep. 9, 2022. Access data 204 for this instance of accessing the first document 304a indicates the first document 304a is open for ten minutes without modifications being made. FIG. 3 further illustrates the UID 302 accessing the second document 304b on Oct. 1, 2022 and again on Oct. 17, 2022. Access data 204 for each of these instances of accessing the second document 304b indicates the second document 304b was opened, but a duration of how long the second document 304b was opened is unavailable. The access data 204 for each instance of accessing the documents 304a-304b is received by the TBA 126 as the indication 202 as illustrated in FIG. 2.

Based on this access data 204, the document analysis tool 128 may calculate consumption through various different ways. In some examples, the document analysis tool 128 defines consumption based on the time the UID 302 spent accessing the respective documents 304a-304b. In another example, the document analysis tool 128 defines consumption based on an amount of content within the documents 304a-304b that was consumed, such as a number of words that were read. The document analysis tool 128 further assigns different weights to the consumption of the documents 304a-304b. In the example illustrated in FIG. 3, the document analysis tool 128 generates a higher consumption score for the second document 304b than the first document 304a because not only did the UID 302 access the second document 304b twice compared to accessing the first document 304a one time, but the second document 304b has also been accessed more recently than the first document 304a.

Figure 4A:
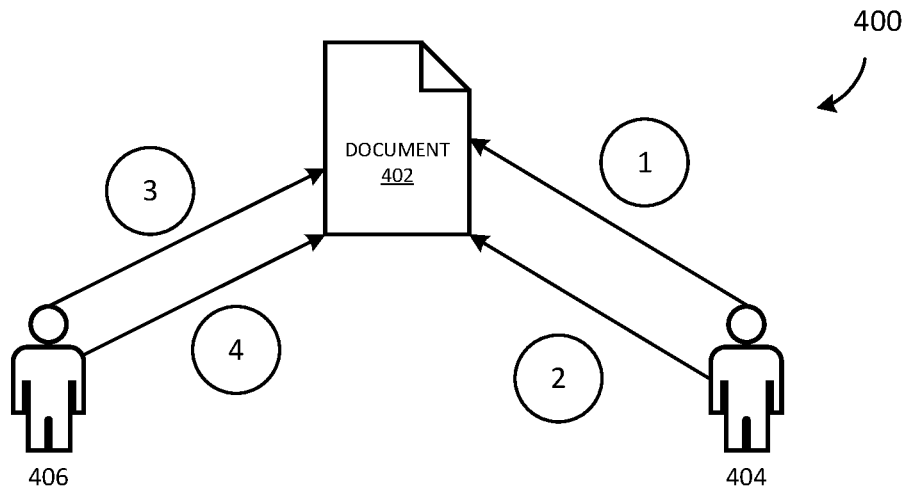
FIG. 4A is an example diagram illustrating collaboration to generate a document.
Figure 4B:
FIG. 4B illustrates example tables that quantify authorship of a document based on the example diagram illustrated in FIG. 4A.

FIG. 4A is an example diagram illustrating collaboration to generate a document. FIG. 4B illustrates example tables that quantify authorship of a document based on the example diagram illustrated in FIG. 4A. The diagram 400 illustrated in FIG. 4A and the first table 410 and the second table 420 illustrated in FIG. 4B are provided for illustration only. Other examples of the diagram 400, the first table 410, and the second table 420 can be used without departing from the scope of the present disclosure.

The diagram 400 illustrates a document 402 that is authored by a first UID 404 and a second UID 406. The table 410 illustrates a list of actions performed on the document 402 by each of the first UID 404 and the second UID 406, along with the actor that performed each action, an action number corresponding the identification in the diagram 400, a size of the data added by the action, and an impact of the action. The impact of the action is measured such that a higher impact number represents a greater impact to the document and therefore, the contribution score for each contributor. For example, an impact of two is greater than an impact of one, and an impact of three is greater than an impact of two.

In action number one, the first UID 404 creates the document 402. This action adds 700 kilobytes (KB) of data to the document 402 and has an impact of one. In action number two, the first UID 404 edits the document 402 and adds 300 KB of data. This action has an impact of three, which is greater than the impact of one by creating the document 402 in action number one. In action number three, the second UID 406 edits the document 402 and adds 200 KB of data. This action has an impact of two. In action number four, the second UID 406 edits the document 402 and adds 25 KB of data. This action has an impact of three.

In some examples, the document analysis tool 128 generates the impact score for each action. For example, the impact score for creating the document 402 is predetermined to be a score of one. The impact scores of actions number two and four, which are scores of three, are generated based on the content of the edits that were made comprising the respective actions. The impact score may be generated to be three based on one or more of the size of the content added by the edit, whether the content added is an image or text, and so forth. For example, even though the action number four is an edit to add 25 KB of data and the action number three is an edit to add 200 KB of data, action number four is determined to be of a greater impact to the document 402 than action number three because the content contained in the 25 KB is determined to be more valuable than the 200 KB of data.

The document analysis tool 128 transforms the data contained in the first table 410 into contribution scores for each of the first UID 404 and the second UID 406 and generates the second table 420 based on the generated contribution scores. For example, the document analysis tool 128 determines a percentage of impact by each UID of their respective actions. For example, the sum of the respective impact scores is nine, determined based by adding one, three, two, and three. The total impact of the first UID 404 is four, i.e., an impact score of one for action one and an impact score of three for action two, and the total impact of the second UID 406 is five, i.e., an impact score of two for action three and an impact score of three for action four. The total impact of the first UID 404 is four of nine, which is forty-five percent, which is the total contribution of the first UID 404 to the document 402. Similarly, the total impact of the second UID 406 is five out of nine, which is fifty-five percent, which is the total contribution of the second UID 406 to the document 402. Accordingly, the document analysis tool 128 determines the contributions of each respective UID based not only on the total amount of content added, i.e., determined by KB of data, and instead determines the contributions of each respective UID based on weighted aspects of different types of content within the documents.

Figure 5A:
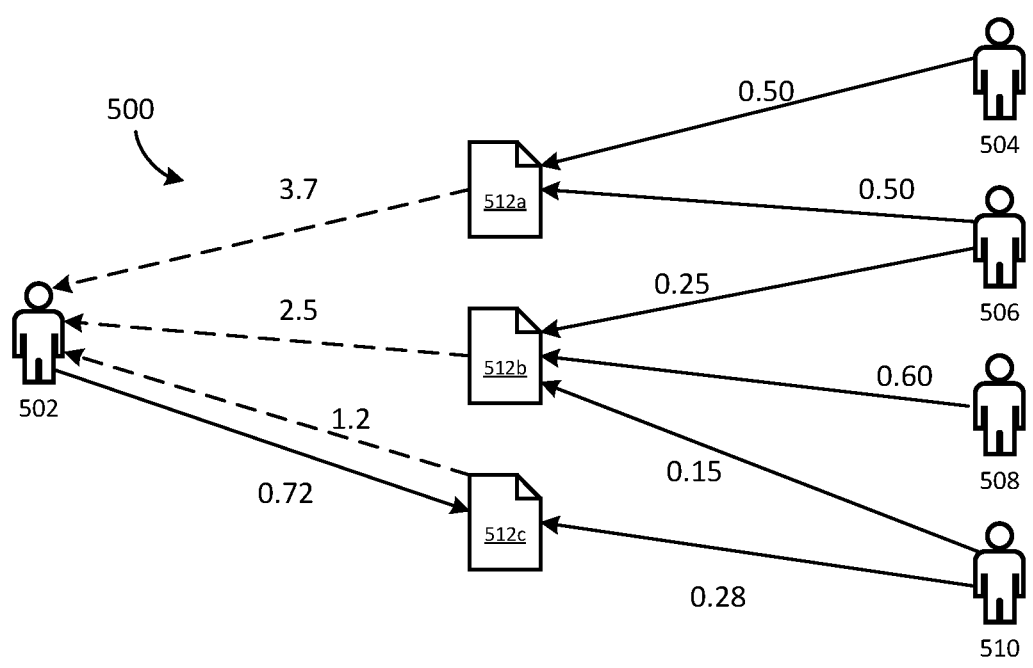
FIG. 5A is an example diagram illustrating quantifying consumption and authorship of documents.

FIG. 5A is an example diagram illustrating quantifying consumption and authorship of documents. The diagram 500 illustrated in FIG. 5A is provided for illustration only. Other examples of the diagram 500 can be used without departing from the scope of the present disclosure.

The diagram 500 illustrates a first UID 502. The first UID 502 is associated with a user that accesses documents 512a-512c via one or more external devices 148. The diagram 500 further illustrates a second UID 504, a third UID 506, a fourth UID 508, and a fifth UID 510. For a particular UID, e.g., the first UID 502, the TBA 126 determines the author or authors of each of the documents 512*a*-512*c* accessed by the first UID 502 since the previous indication 202 is received. In the example illustrated in the diagram 500, the UID 502 accessed the first document 512*a*, the second document 512*b*, and the third document 512*c*. The TBA 126 determines the first document 512*a* is authored by the second UID 504 and the third UID 506, and more particularly determines an authorship score of 0.5 for each of the second UID 504 and the third UID 506 as described herein for the first document 512*a*. The TBA 126 determines the second document 512*b* is authored by the third UID 506, the fourth UID 508, and the fifth UID 510, and more particularly determines an authorship score of 0.25 for the third UID 506, of 0.60 for the fourth UID 508, and of 0.15 for the fifth UID 510 as described herein for the second document 512*b*. The TBA 126 determines the third document 512*c* is authored by the first UID 502 and the fifth UID 510, and more particularly determines an authorship score of 0.72 for the first UID 502 and an authorship score of 0.28 for the fifth UID 510 as described herein for the third document 512*c*.

In some examples, an authorship score is generated based on the contribution score, such as shown in FIGS. 4A-4B. For example, a contribution score of fifty five percent, as illustrated in FIG. 4B, is transformed into an authorship score of 0.55, while a contribution score of forty-five percent is transformed into an authorship score of 0.45.

The TBA 126 further determines a consumption score for each of the documents 512*a*-512*c*. As described herein, the consumption score measures the level of consumption of each document 512*a*-512*c* by the first UID 502. As illustrated in FIG. 5A, the consumption score for the first UID 502 of the first document 512*a* is 3.7, the consumption score for the first UID 502 of the second document 512*b* is 2.5, and the consumption score for the first UID 502 of the third document 512*c* is 1.2.

Figure 5B:
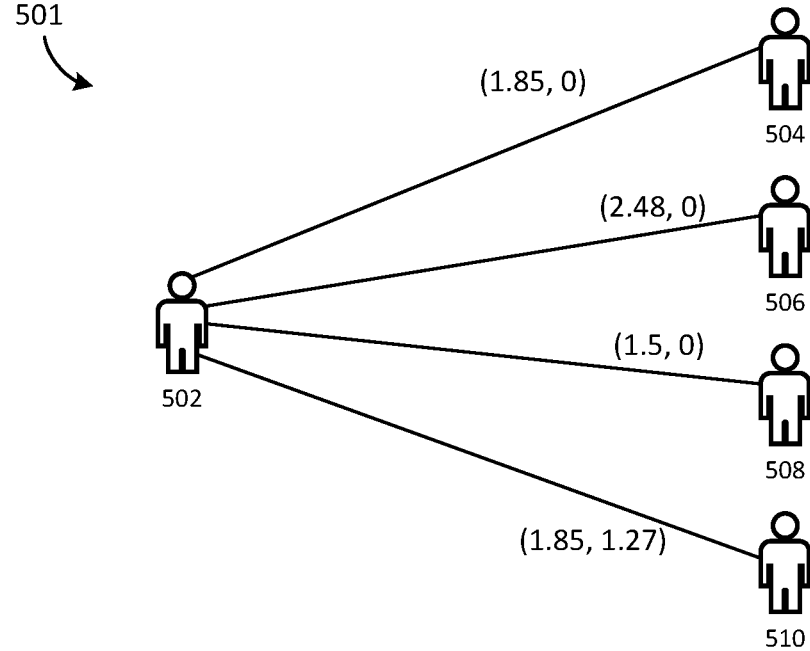
FIG. 5B is an example diagram illustrating a relationship to different authors based on the quantified consumption.

FIG. 5B is an example diagram illustrating a relationship to different authors based on the quantified consumption. The diagram 501 illustrated in FIG. 5B is provided for illustration only. Other examples of the diagram 501 can be used without departing from the scope of the present disclosure. File consumption, or consumption of a document, is based on how many times a UID accessed the file and how long the UID had the file open.

The diagram 501 illustrates relationships between the first UID 502 and each of the second UID 504, third UID 506, fourth UID 508, and fifth UID 510 based on the quantified consumption scores, or authorship scores, and co-authorship scores illustrated in the diagram 500 in FIG. 5A. The document analysis tool 128 generates the relationships, which are stored in the enterprise authorship database 118. The consumption score represents an amount of content that the first UID 502 consumes from the other UID, while the co-authorship score represents an amount of collaboration of the first UID 502 with the other UID. The consumption scores and authorship scores are presented as (consumption score, co-authorship score).

For example, the diagram 501 illustrates that the only UID with which the UID 502 co-authors a document is the fifth UID 510. Accordingly, the co-authorship score for the fifth UID 510 is shown as 1.27, while the co-authorship scores for each of the second UID 504, the third UID 506, and the fourth UID 508 are 0.0.

The relationships presented in the diagram 501 illustrate various properties that are implemented by the recommendation generating model 138 to generate recommendations for a particular UID. For example, these properties include an author name, a time-decayed author score (AuthorScore)

that represents a how much time the UID has spent consuming the author, a time decayed co-author score (CoAuthorScore) that represents a level of collaboration with the co-author, author score buckets (AuthorScoreBuckets) that represent scores for each of a previous lookback period, such as four weeks, twelve weeks, twenty weeks, and so forth, and co-author score buckets (CoAuthorScoreBuckets) that represent scores for each of a previous lookback period, such as four weeks, twelve weeks, twenty weeks, and so forth. Accordingly, the co-author score is calculated using Equation 2, presented below, where alpha is 0.8 and i represents the lookback period.

$$\text{Author Score} = \qquad\qquad\qquad\qquad\text{Equation 2}$$
$$(1-a)*\sum_{i=0}^{20}\alpha^i \text{ Author Score Buckets } [i \text{ weeks ago}]$$

It should be understood that the authorship scores, consumption scores, co-authorships scores illustrated in FIGS. 5A-5B are presented for illustration only and should not be construed as limiting. More or fewer than four relationships may be determined by the TBA 126 for a single UID based on an indication 202 received from the cloud server 144. In some examples, although FIGS. 5A-5B illustrate relationships between the first UID 502 and other UIDs, the TBA 126 may determine relationships for each of the second UID 504, the third UID 506, the fourth UID 508, and the fifth UID 510 in addition to or instead of determining the relationships for the first UID 502.

FIG. 5C illustrates an example of a parsed response from the enterprise authorship database 118 that presents authorship scores and co-authorship scores for a first UID and a second UID. The example of the parsed response 520 is presented for illustration only and should not be construed as limiting. Other examples of a parsed response 520 can be used without departing from the scope of the present disclosure. For example, the parsed response 520 is a tabular representation of FIG. 5B. In other words, the parsed response illustrates an example schema used to store the favorite author data generated as shown in FIG. 5B.

The parsed response 520 illustrated in FIG. 5C may be presented on the UI 110 in response to a query by a user, such as UID, via the external device 148. The parsed response 520 presents multiple UIDs and their respective author score totals, co-author score totals, decayed author scores, decayed co-author scores, the last time each UID modified the document, author buckets, and co-author buckets.

Figure 6:
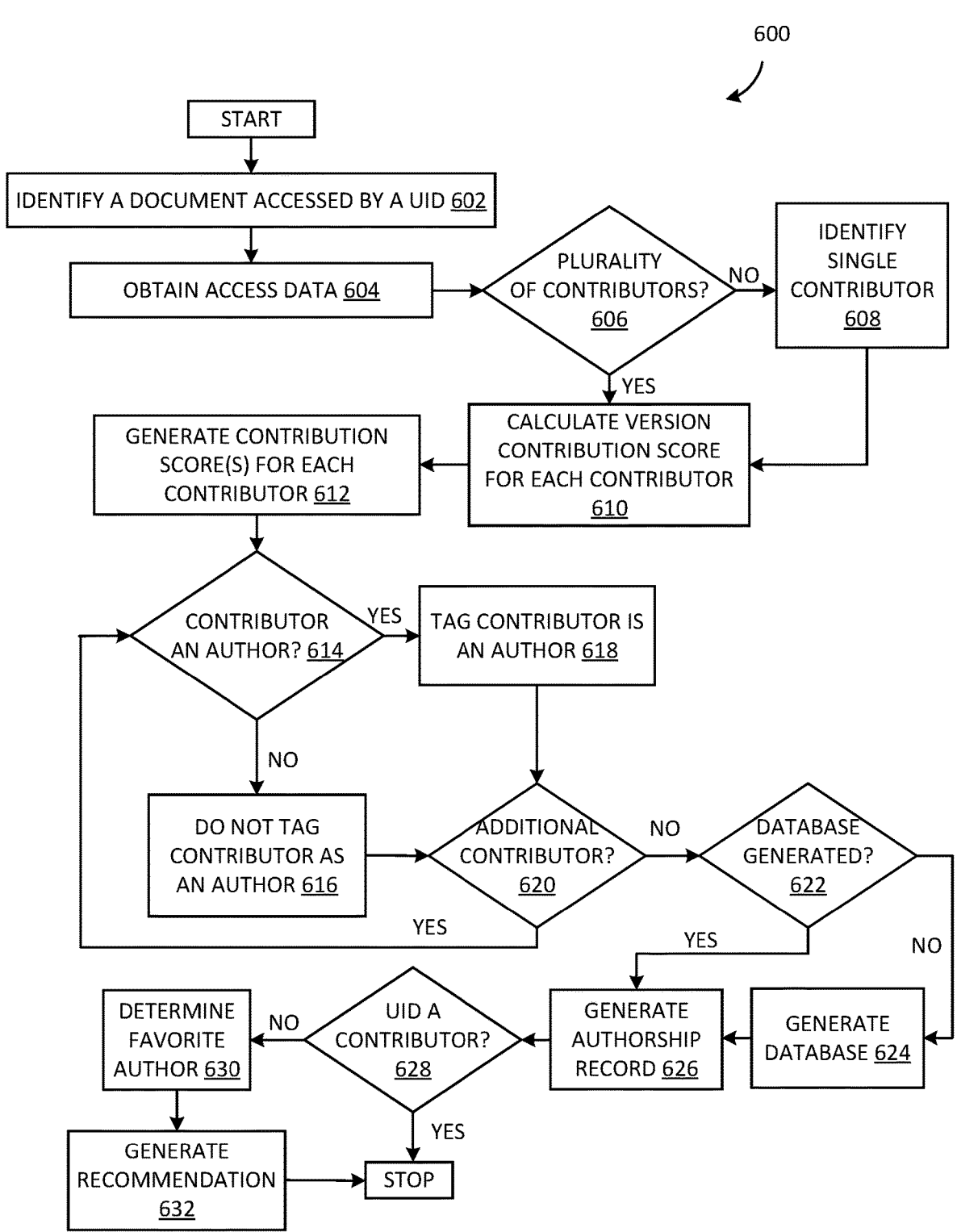
FIG. 6 is an example flowchart illustrating a computer-implemented method of determining a favorite author of a user identifier (UID)

FIG. 6 is an example flowchart illustrating a computer-implemented method of determining a favorite author of a UID. The computer-implemented method 600 of FIG. 6 is provided for illustration only and should not be construed as limiting. Other examples of the computer-implemented method 600 can be used without departing from the scope of the present disclosure. In some examples, the computer-implemented method 600 is implemented by one or more components of the computing device 102.

The computer-implemented method 600 begins by the TBA 126 identifying a document accessed by a UID in operation 602. In some examples, the TBA 126 identifies a document, such as the document 146, is accessed by a UID based on access data 204 received in an indication 202 received by the document analysis tool 128 from the cloud server 144. As described herein, the indication 202 indicates that the document 146 has been accessed via a UID using an external device 148 and includes the access data 204.

In operation 604, the document analysis tool 128 obtains the access data 204 regarding the access of the document 146. As described herein, the access data 204 includes access information describing a time at which the document 146 was accessed, how long the document 146 was accessed, whether content in the document 146 was modified, and if content was modified, a list of modifications to the content. In some examples, the access data 204 received in the indication 202 is then stored in the data storage device 114 as historical data 116.

In operation 606, the document analysis tool 128 determines whether the document 146 includes a plurality of contributors. For example, a document with one version is a document that was created and modified a single time by a single contributor. A document with a plurality of versions is a document that has been created and modified, saved, and modified at least one additional time to create a first, or initial, version and a final, or last, version. A document with a single contributor is a document for which a single contributor both created the document and made each and every modification to the document. A document with a plurality of contributors is a document that has been modified by at least two different contributors. It should be understood that a document may have a contributor author and multiple versions, a single contributor and one version, multiple contributors and multiple versions, or multiple contributors and a single version.

In operation 608, based on determining the document 146 does not include a plurality of contributors, the document analysis tool 128 identifies a single contributor to the document 146. In some examples, the document analysis tool 128 automatically determines the document includes a single contributor based on the access data 204 indicating a single version of the document 146. In some examples, the document analysis tool 128 determines the document includes a single contributor based on an analysis of the access data 204 and determining that each modification of the document 146 is attributed to the same contributor.

In operation 610, based on determining the document 146 includes a plurality of contributors in operation 606 or a single contributor being identified in operation 608, the document analysis tool 128 calculates a version contribution score for each contributor for each version of the document 146. In other words, the document analysis tool 128 identifies, based on the access data 204, each contributor of which at least one modification to the document 146 is attributed. Then, for each version of the document 146, the document analysis tool 128 calculates a contribution score for each identified contributor as described herein.

In operation 612, the document analysis tool 128 generates a contribution score for each contributor to the document 146. In some examples, the contribution scores for different versions are weighted and the document analysis tool 128 generates the contribution score for each contributor based on weighted contribution scores for each version. For example, contribution scores for the final version of the document 146 may be weighted more heavily than contributions to earlier, non-final versions of the document 146. As described herein, the overall contribution score for the document 146 for each contributor measures the contribution of the respective contributor to the document 146 as a whole.

Each of the version contribution score and the overall contribution score may be expressed in various terms. In some examples, each of the version contribution score and the overall contribution score are expressed numerically from 0.0 to 1.0, where 0.0 indicates no contribution to the document and 1.0 indicates the contributor was the sole contributor to the document. In other examples, each of the version contribution score and the overall contribution score are expressed numerically from 0.0 to a value greater than 1.0, such as 5.0, 10.0, 100.0, and so forth.

In operation 614, for a first identified contributor, the document analysis tool 128 determines whether the contributor is an author of the document 146. In some examples, the document analysis tool 128 determines the one or more authors of the respective document by comparing the generated overall contribution of each contributor to a contribution threshold. In other examples, the document analysis tool 128 determines the one or more authors of the respective document based on the assigned weights to each portion of the obtained access data. In examples where the contributor is not determined to be an author, in operation 616 the document analysis tool 128 determines to not tag the contributor as an author. In examples where the contributor is determined to be author, in operation 618 the document analysis tool 128 tags the identified contributor as an author.

In operation 620, the document analysis tool 128 determines whether an additional contributor is to be determined as an author or not an author. Where an additional contributor is identified, the computer-implemented method 600 returns to operation 614. Once the document analysis tool 128 determines no additional contributors need to be determined as an author or not an author, the computer-implemented method 600 proceeds to operation 622.

In operation 622, the document analysis tool 128 determines whether an enterprise authorship database 118 has been created. For example, in a first iteration of the computer-implemented method 600, the document analysis tool 128 determines the enterprise authorship database 118 has not been created and, in operation 624, proceed to generate the enterprise authorship database 118. Where the document analysis tool 128 determines that an enterprise authorship database 118 has been created, i.e., in each subsequent iteration of the computer-implemented method 600, the document analysis tool 128 proceeds to operation 626 and generates an authorship record 206 for the document 146. The generated authorship record 206 includes an identifier for the particular document and the UID or UIDs associated with the author or authors, respectively, of the document.

In operation 628, the document analysis tool 128 determines whether the UID that accessed the document 146 is identified as one of the contributors to the document 146. For example, the document analysis tool 128 maps the UID to the list of authors in each authorship record of documents the UID has accessed from the authorship records 206 stored in the enterprise authorship database 118. In examples where the UID that accessed the document 146 is identified as one of the contributors to the document 146, i.e., the UID is mapped to an author in the authorship record 206 of the document in the enterprise authorship database 118, the computer-implemented method 600 terminates. In examples where the UID that accessed the document 146 is not identified as one of the contributors to the document 146, the computer-implemented method 600 proceeds to operation 630.

In operation 630, the favorite author model 134 determines a favorite author for the UID. In particular, the favorite author model 134 analyzes the entirety of the generated authorship records 206 for the UID that are stored in the enterprise authorship database 118 to generate an authorship score corresponding to each author listed in the generated authorship records, including but not limited to the document identified as accessed in operation 602. As described herein, the favorite author model 134 aggregates or weights the authorship scores based on aggregate percentage or maximum weight for a particular document or type of document to generate authorship scores for each document. The generated authorship scores are ranked from highest to lowest. The UID associated with the highest authorship score is determined to be the favorite author for the particular UID. Examples of determining a favorite author are described in greater detail below with regard to FIG. 7.

In operation 632, the recommendation generating model 138 generates a recommendation for the UID based on the determined favorite author. In some examples, the recommendation is a recommendation to access additional documents of which the identified favorite author has also authored, but the UID has not yet accessed. In some examples, the recommendation generating model 138 monitors changes in a UID's favorite authors over time and the recommendation is to access documents of an author who previously was a favorite author of the UID, but has been accessed less often recently. Following the recommendation being generated, the computer-implemented method 600 terminates.

FIG. 7 is an example flowchart illustrating a computer-implemented method of determining a favorite author of a UID. The computer-implemented method 700 of FIG. 7 is provided for illustration only and should not be construed as limiting. Other examples of the computer-implemented method 700 can be used without departing from the scope of the present disclosure. In some examples, the computer-implemented method 700 is implemented by one or more components of the computing device 102.

The computer-implemented method 700 begins by the TBA 126 receiving a trigger in operation 702. In some examples, the trigger event is receiving a indication 202 indicating a document 146 has been accessed by a UID. In other examples, the trigger event is a predetermined interval, such as a time of day or day of the week.

In operation 704, the favorite author model 134 determines a lookback period for which to determine the favorite author, or authors, of a UID. In some examples, the lookback period is infinite. In other words, the lookback period to determine the favorite author of a UID is an entirety of the time the UID has been accessing documents. In some examples, the lookback period is one week, two weeks, three weeks, four weeks, and so forth.

In operation 706, the favorite author model 134 generates a raw authorship score for each accessed document within the lookback period. The authorship score for each accessed document is generated based on a percentage of content of the document each author has contributed. In operation 708, the favorite author model 134 creates a common score and weight by accurately computing a time decaying function. In some examples, a histogram is generated that is used to accurately compute the time decaying function.

In operation 710, the favorite author model 134 assigns weights to different factors that affect the rankings of the authors. Different factors include recency of the document authored, a type of document authored, a frequency at which the UID accesses documents by the author, and so forth. In operation 712, the favorite author model 134 normalizes the authorship scores based on the assigned weights. For example, where the authorship scores are percentages, the scores are normalized between 0 and 1 and they all sum to 1 for each document.

In operation 714, the favorite author model 134 generates the ranking of favorite authors within the lookback period. In some examples, the ranking is a list of the highest weighted and normalized authorship scores, where the highest score indicates the favorite author of the UID. In operation 716, the generated ranking is stored, such as in the enterprise authorship database 118.

In operation 718, the recommendation generating model 138 generates a recommendation for the UID based on the determined favorite author. In some examples, the recommendation is a recommendation to access additional documents of which the identified favorite author has also authored, but the UID has not yet accessed. In some examples, the recommendation generating model 138 monitors changes in a UID's favorite authors over time and the recommendation is to access documents of an author who previously was a favorite author of the UID, but has been accessed less often recently. Following the recommendation being generated, the computer-implemented method 700 terminates.

Figure 8:
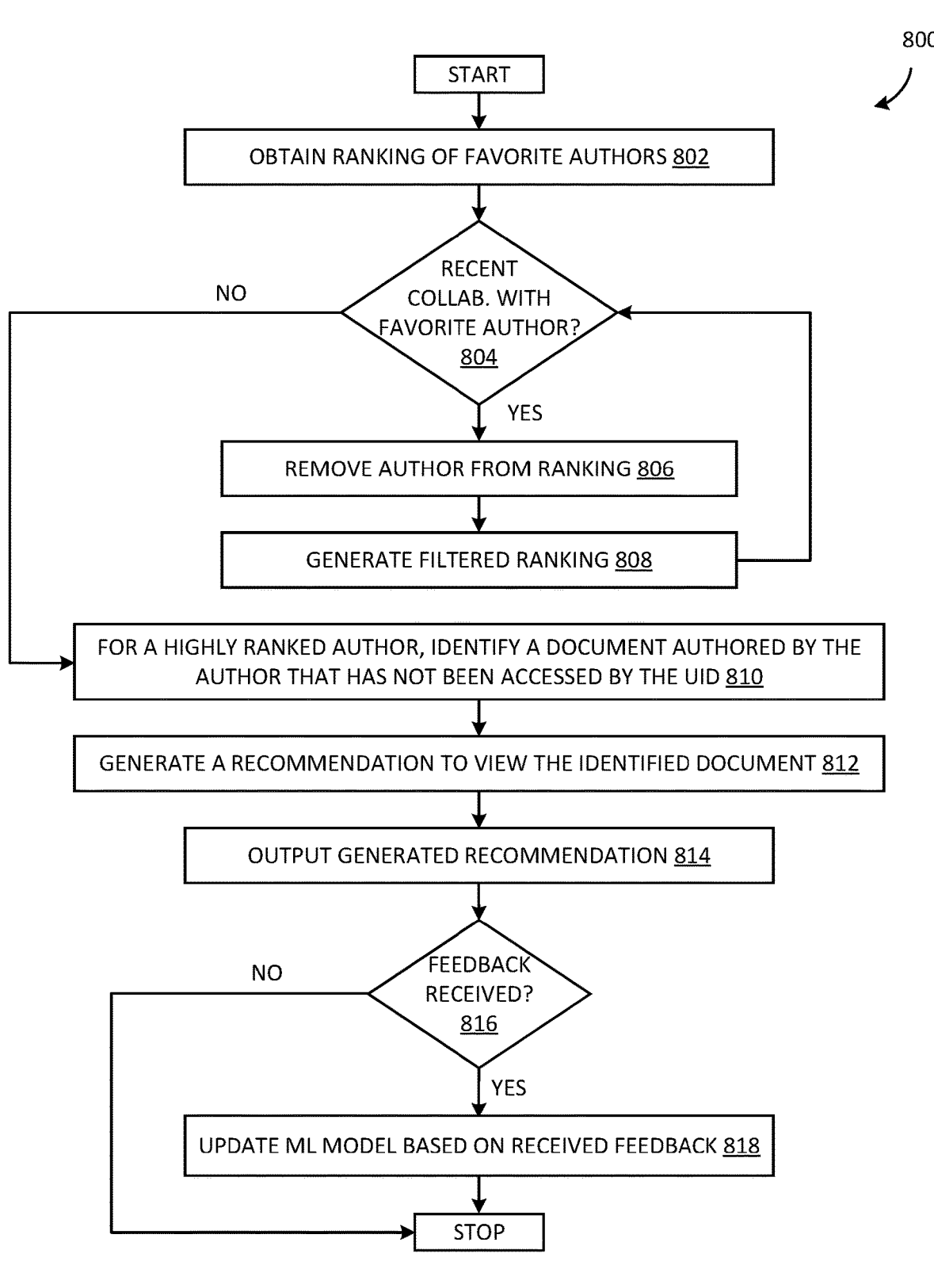
FIG. 8 is an example flowchart illustrating a computer-implemented method of generating a recommendation based on a determined favorite author.

FIG. 8 is an example flowchart illustrating a computer-implemented method of generating a recommendation based on a determined favorite author. The computer-implemented method 800 of FIG. 8 is provided for illustration only and should not be construed as limiting. Other examples of the computer-implemented method 800 can be used without departing from the scope of the present disclosure. In some examples, the computer-implemented method 800 is implemented by one or more components of the computing device 102.

The computer-implemented method 800 begins by the recommendation generating model 138 obtaining the ranking of favorite authors for a particular UID during a particular lookback period in operation 802. The ranking of favorite authors is generated by the favorite author model 134 and stored in the enterprise authorship database 118.

In operation 804, the recommendation generating model 138 identifies the favorite author of the UID from the obtained ranking and determines whether the UID has collaborated recently with the favorite author. In particular, the recommendation generating model 138 analyzes the documents for which the UID is an author over the lookback period to determine whether the favorite author is an author of any of the documents for which the UID is an author over the lookback period. In some examples, the recommendation generating model 138 obtains the authorship data for the documents from the enterprise authorship database 118.

Where the recommendation generating model 138 determines the UID has recently collaborated with the favorite author, the computer-implemented method 800 proceeds to operation 806 and identifies the favorite author as a co-collaborator and removes the favorite author from the favorite author ranking, and in operation 808 generates a filtered favorite author ranking that does not include the previous favorite author. The filtered favorite author ranking is similar to the initial favorite author ranking, but does not include the favorite author with which the UID has recently collaborated. The recommendation generating model 138 removes co-collaborators from the initial favorite author ranking in order to generate a more robust recommendation to the UID for consumption or collaboration. The UID recently collaborating with the favorite author reduces the likelihood that a recommendation to collaborate with the favorite author is needed, and a different recommendation is likely to be more valuable to the UID. Following the generation of the filtered favorite author ranking, the computer-implemented method 800 returns to operation 804 and determines whether the UID has collaborated recently with the new favorite author in the filtered favorite author ranking.

Where the recommendation generating model 138 determines the UDI has not recently collaborated with the favorite author, the computer-implemented method 800 proceeds to operation 810 and, for the favorite author, identifies a document authored by the favorite author that has not been accessed by the UID. In some examples, the recommendation generating model 138 analyzes the authorship records 206 in the enterprise authorship database 118 to identify the documents which the favorite author has authored and filters the documents to remove the documents which have been accessed by the UID. The recommendation generating model 138 sorts the filtered documents according to various examples to identify a document to recommend to the UID. In some examples, the recommendation generating model 138 sorts the filtered documents by authorship score so that the documents which the favorite author has the highest authorship score are identified for recommendation to the UID. In some examples, the recommendation generating model 138 sorts the filtered documents by date so that the documents which the favorite author has authored most recently are identified for recommendation to the UID. In some examples, the recommendation generating model 138 sorts the filtered documents by viewership count so that the documents authored by the favorite author that have the highest viewership count by other UIDs are identified for recommendation to the UID. The recommendation generating model 138 then identifies a document from the sorted filtered documents, such as a document with a highest authorship score of the author, a document that has been authored most recently by the author, or a document with a highest viewership count authored by the author. In some examples, the recommendation generating model 138 sorts the filtered documents by topic so that the documents authored by the favorite author that have a topic similar to the topic or topics the UID views most often are identified for recommendation to the UID.

In operation 812, the recommendation generating model 138 generates a recommendation to view the identified document and in operation 814, outputs the generated recommendation. In some examples, the recommendation is generated and output in the form of a notification, or prompt, to the UID to view the document. In some examples, the recommendation is generated and output in the form of a message, such as an email, that is transmitted to the UID. In some examples, the recommendation includes a link to the document or includes the document as an attachment.

It should be understood that the example recommendations presented in operations 810-812 are presented for illustration only and should not be construed as limiting. Other examples of recommendations may be implemented without departing from the scope of the present disclosure. In some examples, instead of or in addition to the recommendation to view a document as described herein, the generated recommendation is a recommendation to connect with the author and includes a link to send an electronic message to the author or a link to a calendar invite to schedule a meeting with the author.

In operation 816, the recommendation generating model 138 determines whether feedback is received regarding the generated recommendation that is output in operation 814. For example, the output recommendation may include a prompt for the UID to provide feedback that indicates the recommended document has been viewed previously, such as before the lookback period, that the content of the recommended document is either relevant or not relevant to the UID, that indicates whether the UID has connected or attempted to connect with the author, and so forth. In examples where feedback is received, such as via the feedback receiver 140, the recommendation generating model 138 proceeds to operation 818 and the ML model of the recommendation generating model 138 is updated based on the feedback received. In examples where no feedback is received, and/or following the ML model of the recommendation generating model 138 being updated, the computer-implemented method 800 terminates.

Figure 9:
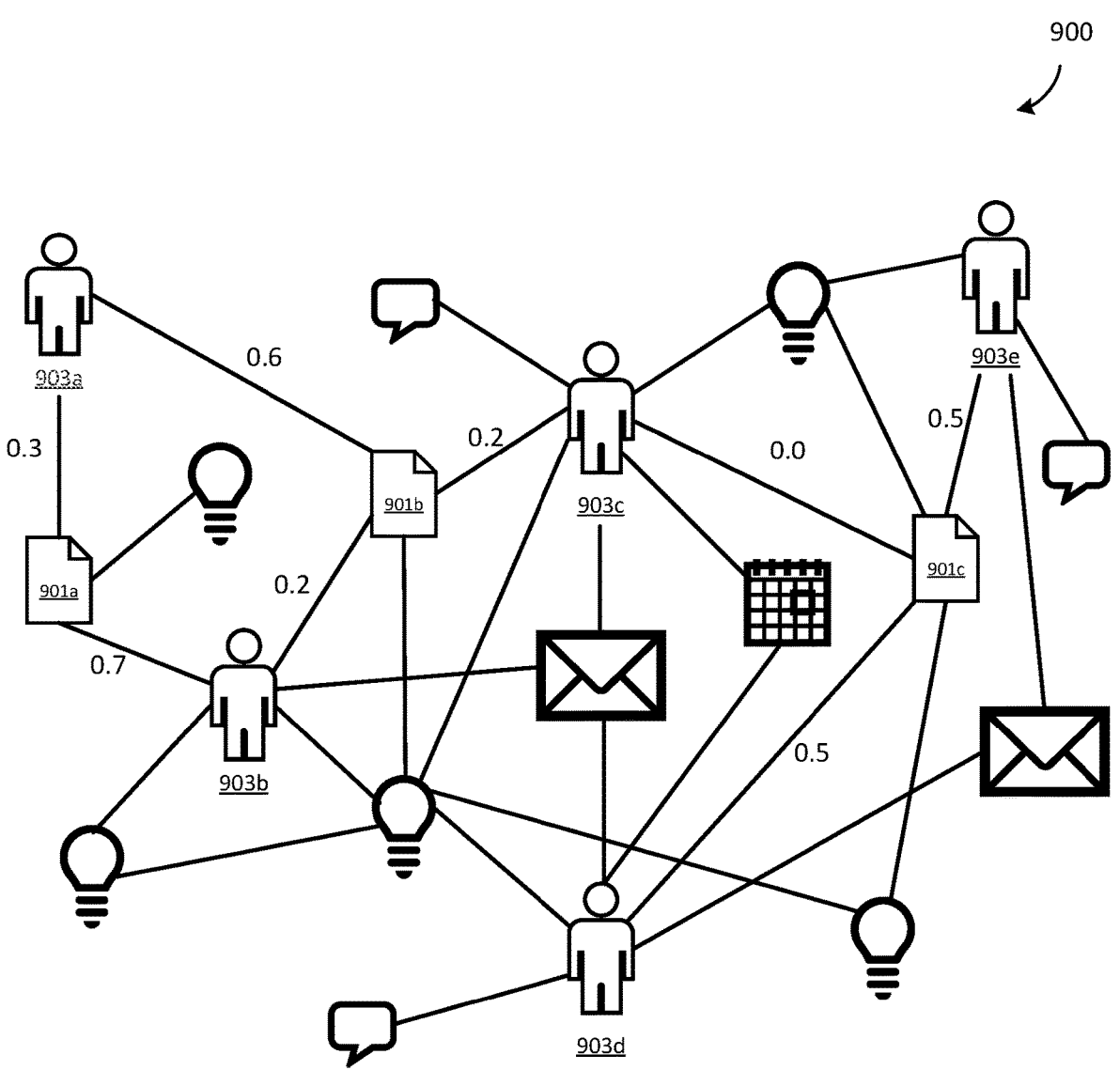
FIG. 9 is an example web illustrating collaboration scores for documents by different contributors.

FIG. 9 is an example web illustrating collaboration scores for documents by different contributors. The web 900 illustrated in FIG. 9 is provided for illustration only. Other examples of the web 900 can be used without departing from the scope of the present disclosure.

The web 900 is an artificial intelligence (AI) graph that illustrates the collaborative relationships between UIDs using files, ideas, messages, and meetings. The web 900 illustrates a plurality of documents 901*a*-901*c* authored by one or more of a plurality of UIDs 903*a*-903*e* Connecting lines between each UID 903*a*-903*e* and documents 801*a*-803*c* are identified with authorship scores for the UIDs 903*a*-903*e* for the respective documents 901*a*-903*c*. As illustrated in FIG. 9, the authorship scores are generated and presented on a scale of 0.0 to 1.0, where 0.0 indicates no authorship by the UID and 1.0 represents complete authorship of the document by the UID. For example, the web 900 illustrates that for the first document 901*a*, the first UID 903*a* has a 0.3 authorship score and the second UID 903*b* has a 0.7 authorship score, indicating the second UID 903*b* contributed more to the first document 901*a* than the first UID 903*a*. For the second document 901*b*, the first UID 903*a* has a 0.6 authorship score, the second UID 903*b* has a 0.2 authorship score, and the third UID 903*c* has a 0.2 authorship score. For the third document 901*c*, the fourth UID 903*d* and the fifth UID 903*e* each have a 0.5 authorship score.

FIG. 10 is an example flowchart illustrating a computer-implemented method of determining a favorite collaborator of a UID. The computer-implemented method 1000 of FIG. 10 is provided for illustration only and should not be construed as limiting. Other examples of the computer-implemented method 1000 can be used without departing from the scope of the present disclosure. In some examples, the computer-implemented method 1000 is implemented by one or more components of the computing device 102.

The computer-implemented method 1000 begins by the collaboration tool 130 identifying one or more records for a first UID in operation 1002. The identified records may be authorship records 206 stored in the enterprise authorship database 118 that indicate each document the first UID has authored or accessed within a lookback period. In operation 1004, the collaboration tool 130 identifies a plurality of documents that have been modified by the first UID and generates a listing of the identified plurality of documents. For example, the collaboration tool 130 sorts the identified authorship records 206 by authorship to determine the plurality of documents the first UID has authored, or co-authored, during the lookback period.

In operation 1006, the collaboration tool 130 identifies a second UID that has modified at least one document of the plurality of documents in addition to the first UID. In other words, the collaboration tool 130 identifies at least one document modified by the first UID and then identifies the second UID that has also modified the document. In operation 1008, the collaboration tool 130 identifies a plurality of documents modified by the second UID. The collaboration tool 130 generates a listing of the plurality of documents modified by the second UID.

In operation 1010, the collaboration tool 130 generates a collaboration intensity (CI) score between the first UID and the second UID based on the documents authored by each of the first UID and the second UID. The CI score measures a collaborative relationship that quantifies a collaboration strength between the first UID and the second UID during the lookback period. In some examples, the CI score is weighted based on time. For example, where the lookback period is four weeks, the CI score between the first UID and the second UID is higher where collaboration between the first UID and the second UID occurred one week ago rather than when the same level of collaboration between the first UID and the second UID occurred three weeks ago. In other words, the CI score may include a recency bias to generate a higher score for collaborators with which the first UID has recently collaborated with.

In operation 1012, the collaboration tool 130 generates a collaboration index that includes a nexus between the first UID and the second UID. The collaboration nexus includes the generated CI score that measures the collaboration strength between the first UID and the second UID.

In operation 1014, the collaboration tool 130 determines whether a trigger event occurs. In some examples, the trigger event is the reception of an indication 202 indicating updates records for a first UID. In other examples, the trigger event is a predetermined interval, such as a time of day or day of the week at which the CI scores are updated. Based on the trigger event occurring, the collaboration tool 130 updates the CI score between the first UID and the second UID and updates the collaboration index with the updated CI score in operation 1016. Following the updated to the CI score and the collaboration index or based on the trigger event not occurring in operation 1014, the computer-implemented method 1000 terminates.

Figure 11:
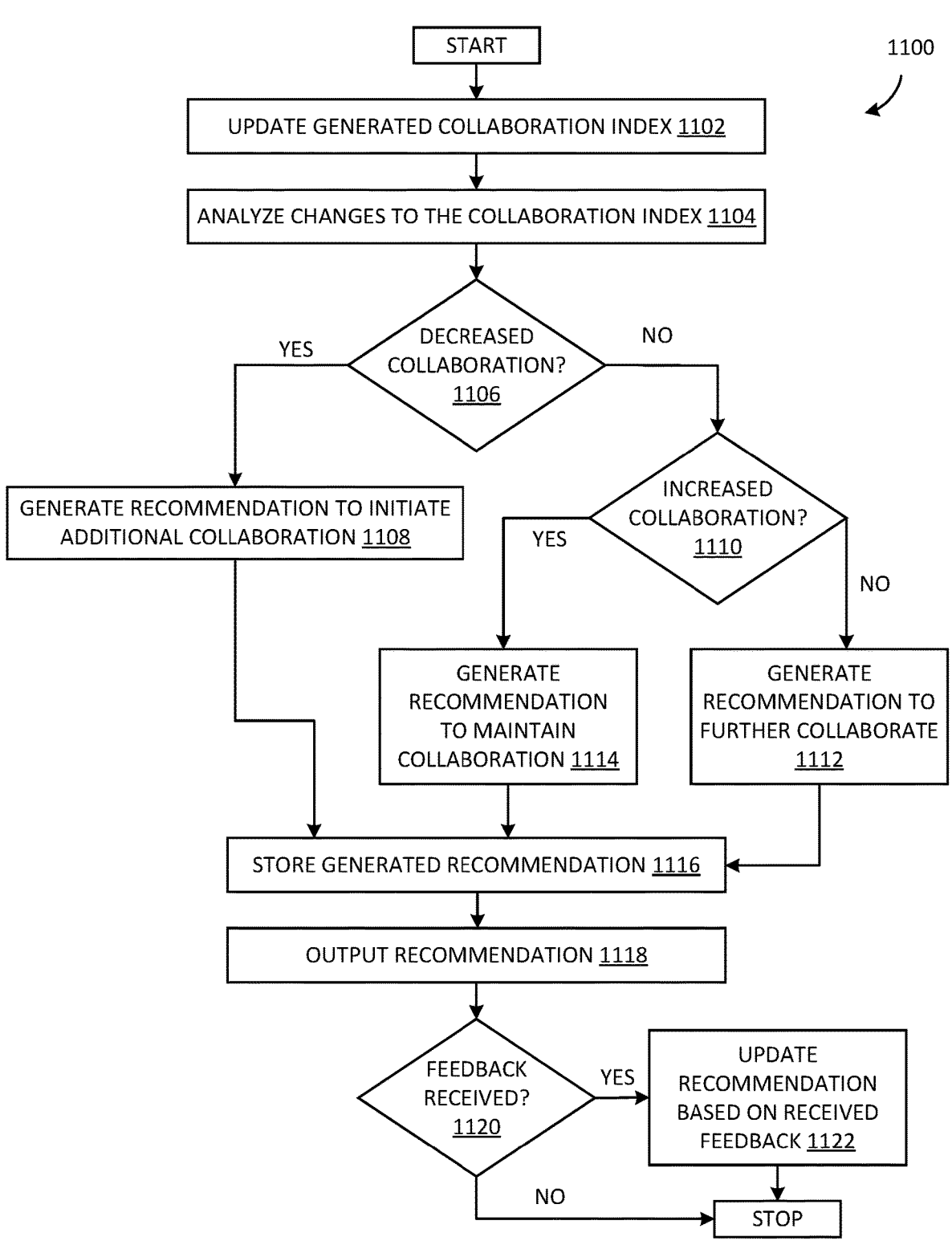
FIG. 11 is an example flowchart illustrating a computer-implemented method of generating a recommendation based on a determined favorite collaborator.

FIG. 11 is an example flowchart illustrating generating a recommendation based on a determined favorite collaborator. The computer-implemented method 1100 of FIG. 11 is provided for illustration only and should not be construed as limiting. Other examples of the computer-implemented method 1100 can be used without departing from the scope of the present disclosure. In some examples, the computer-implemented method 1100 is implemented by one or more components of the computing device 102.

The computer-implemented method 1100 begins by the collaboration tool 130 updating the generated collaboration index in operation 1102. For example, operation 1102 may be an example of operation 1016 illustrated in FIG. 10. For example, the collaboration tool 130 updates the CI score between the first UID and the second UID and updates the collaboration index with the updated CI score.

In operation 1104, the recommendation generating model 138 analyzes changes to the collaboration index that were made in operation 1102. In some examples, the recommendation generating model 138 compares a first version of the collaboration index, i.e., the version of the collaboration index prior to the collaboration index being updated, to a second version, i.e., the version stored following the update, to generate a list of changes that occurred during the update in operation 1102. In other examples, a list of changes is generated as part of the update process and this list is analyzed in operation 1104. In particular, the recommendation generating model 138 analyzes the CI scores between the first UID and the second UID to identify whether the CI scores have increased, decreased, or stayed the same based on the update.

In operation 1106, the recommendation generating model 138 determines whether a level of collaboration between the first UID and the second UID has decreased from the initial version of the collaboration index to the updated version of the collaboration index. In particular, the recommendation generating model 138 determines whether the CI scores between the first UID and the second UID have increased, decreased, or stayed the same based on the update to the collaboration index. In examples where the recommendation generating model 138 determines the CI score has decreased, indicating decreased collaboration between the first UID and the second UID, in operation 1108 the recommendation generating model 138 generates a recommendation to the first UID to initiate additional collaboration with the second UID. In some examples, the recommendation is generated and output in the form of a notification, or prompt, to the first UID to prompt additional collaboration. In some examples, the recommendation is generated and output in the form of a message, such as an email, that is transmitted to the first UID.

In examples where the recommendation generating model 138 determines the CI score has not decreased, in operation 1110 the recommendation generating model 138 determines whether collaboration between the first UID and the second UID has increased, i.e., whether the CI score has increased. In examples where the recommendation generating model 138 determines the CI score has not increased, indicating collaboration between the first UID and the second UID has maintained a consistent level, in operation 1112 the recommendation generating model 138 generates a recommendation to the first UID to further collaborate with the second UID. In examples where the recommendation generating model 138 determines the CI score has increased, indicating collaboration between the first UID and the second UID has increased, in operation 1114 the recommendation generating model 138 generates a recommendation to the first UID to maintain current collaboration levels with the second UID.

Following the recommendation being generated in one or more of operations 1108, 1112, and 1114, in operation 1116 the recommendation generating model 138 stores the generated recommendation in the data storage device 114 and outputs the recommendation in operation 1118. As described herein, the recommendation may be output in the form of a notification, or prompt, to the first UID to prompt additional collaboration or in the form of a message, such as an email, that is transmitted to the first UID.

In operation 1120, the recommendation generating model 138 determines whether feedback is received regarding the generated recommendation that is output in operation 1118.

In examples where feedback is received, such as via the feedback receiver 140, the recommendation generating model 138 proceeds to operation 1122 and the ML model of the recommendation generating model 138 is updated based on the feedback received. In examples where no feedback is received, and/or following the ML model of the recommendation generating model 138 being updated, the computer-implemented method 1100 terminates.

Exemplary Operating Environment

Figure 12:
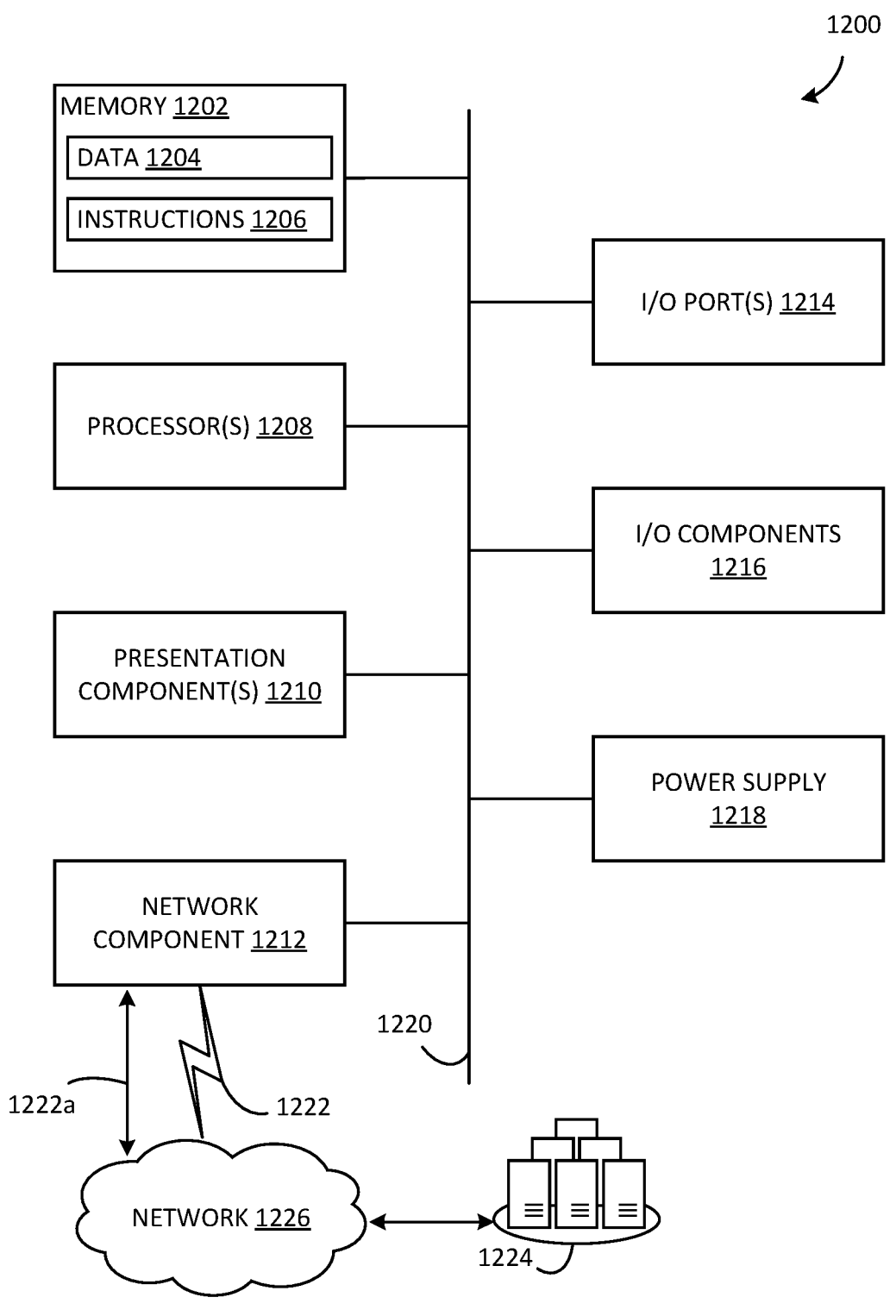
FIG. 12 is a block diagram of an example computing device for implementing examples of the present disclosure.

FIG. 12 is a block diagram of an example computing device 1200 for implementing aspects disclosed herein and is designated generally as computing device 1200. Computing device 1200 is an example of a suitable computing environment and is not intended to suggest any limitation as to the scope of use or functionality of the examples disclosed herein. Neither should computing device 1200 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

In some examples, the computing device 1200 is the computing device 102. Accordingly, the memory 1202, the processor 1208, the presentation component(s) 1210, and the network 1226 can be the memory 104, the processor 108, the user interface 110, and the network 142, respectively. However, these examples should not be construed as limiting. Various examples are possible.

Computing device 1200 includes a bus 1220 that directly or indirectly couples the following devices: computer-storage memory 1202, one or more processors 1208, one or more presentation components 1210, I/O ports 1214, I/O components 1216, a power supply 1218, and a network component 1212. While computing device 1200 is depicted as a seemingly single device, multiple computing devices 1200 may work together and share the depicted device resources. For example, memory 1202 may be distributed across multiple devices, and processor(s) 1208 may be housed with different devices.

Bus 1220 represents what may be one or more busses (such as an address bus, data bus, or a combination thereof). Although the various blocks of FIG. 12 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 12 and the references herein to a "computing device." Memory 1202 may take the form of the computer-storage media references below and operatively provide storage of computer-readable instructions, data structures, program modules and other data for computing device 1200. In some examples, memory 1202 stores one or more of an operating system, a universal application platform, or other program modules and program data. Memory 1202 is thus able to store and access data 1204 and instructions 1206 that are executable by processor 1208 and configured to carry out the various operations disclosed herein. In some implementations, the memory 1202 is the memory 104 and/or the data storage device 114.

In some examples, memory 1202 includes computer-readable storage media in the form of volatile and/or non-volatile memory, removable or non-removable memory, data disks in virtual environments, or a combination thereof. Memory 1202 may include any quantity of memory associated with or accessible by computing device 1200. Memory 1202 may be internal to computing device 1200, external to computing device 1200, or both. Examples of memory 1202 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 1200. Additionally, or alternatively, memory 1202 may be distributed across multiple computing devices 1200, for example, in a virtualized environment in which instruction processing is carried out on multiple computing devices 1200. For the purposes of this disclosure, "computer storage media," "computer-storage memory," "memory," and "memory devices" are synonymous terms for computer-storage memory 1202, and none of these terms include carrier waves or propagating signaling.

Processor(s) 1208 may include any quantity of processing units that read data from various entities, such as memory 1202 or I/O components 1216 and may include CPUs and/or GPUs. Specifically, processor(s) 1208 are programmed to execute computer-executable instructions for implementing aspects of the disclosure. The instructions may be performed by the processor, by multiple processors within computing device 1200, or by a processor external to client computing device 1200. In some examples, processor(s) 1208 are programmed to execute instructions such as those illustrated in the in the accompanying drawings. Moreover, in some examples, processor(s) 1208 represent an implementation of analog techniques to perform the operations described herein. For example, the operations may be performed by an analog client computing device 1200 and/or a digital client computing device 1200. In some implementations, the processor 1208 is the processor 108 and executes various components, such as the TBA 126 and the recommendation model 132 described herein.

Presentation component(s) 1210 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1200, across a wired connection, or in other ways. I/O ports 1214 allow computing device 1200 to be logically coupled to other devices including I/O components 1216, some of which may be built in. Example I/O components 1216 include, for example but without limitation, a microphone, joystick, game pad, satellite dish, scanner, printer, wireless device, etc.

Computing device 1200 may operate in a networked environment via network component 1212 using logical connections to one or more remote computers. In some examples, network component 1212 includes a network interface card and/or computer-executable instructions (e.g., a driver) for operating the network interface card. Communication between computing device 1200 and other devices may occur using any protocol or mechanism over any wired or wireless connection. In some examples, network component 1212 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1212 communicates over wireless communication link 1222 and/or a wired communication link 1222*a* to a cloud resource 1224 across network 1226. Various different examples of communication links 1222 and 1222*a* include a wireless connection, a wired connection, and/or a dedicated link, and in some examples, at least a portion is routed through the internet.

Although described in connection with an example computing device, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for inferring a favorite author of a user includes a memory storing an enterprise authorship database, a processor communicatively coupled to the memory, and a time-based assistant (TBA) implemented on the processor. The TBA identifies a document accessed by a user identifier (UID), identifies contributors to the identified document, generates a contribution score for each contributor of the identified contributors, based on each generated contribution score, determines one or more authors of the identified document, creates an authorship record by associating UIDs of the determined one or more authors with the identified document, and updates the enterprise authorship database with the created authorship record, wherein the authorship record is used to identify a relationship between the UID and the determined one or more authors and generate a recommendation for the UID based on the identified relationship.

An example computer-implemented method for inferring a favorite author of a user includes storing an enterprise authorship database, identifying a plurality of documents accessed by a user identifier (UID), and for each document of the identified plurality of documents, identifying contributors to the document, generating a contribution score for each contributor of the identified contributors, based on each generated contribution score, determining one or more authors of the document, creating an authorship record by associating UIDs of the determined one or more authors with the identified document, and updating the enterprise authorship database with the created authorship record, identifying a relationship between the UID and the determined one or more authors based on the created authorship record, and generating a recommendation for the UID based on the identified relationship.

Examples of computer-readable storage media store computer-executable instructions for inferring a favorite collaborator of a user that, upon execution by a processor, cause the processor to identify records for a first user identifier (UID), identify, based on the identified records, a plurality of documents modified by the first UID, identify a second UID that has modified a document of the plurality of documents also modified by the first UID, and generate a collaboration index, wherein the generated collaboration index is used to identify a relationship between the first UID and the second UID and generate a recommendation for the first UID based on the identified relationship.

Alternatively, or in addition to the other examples described herein, examples include any combination of the following:

receives an indication from an external device indicating the document has been accessed by the UID, the received indication including access data for the identified document; determines that the identified document has a plurality of versions based on the obtained access data; and determines that the identified document has a plurality of contributors based on the obtained access data;

for each version of the plurality of versions, calculates a version contribution score for each contributor of the plurality of contributors; and generates the contribution score using the calculated version contribution score of each version of the plurality of versions;

wherein the obtained access data includes at least one of a time at which the identified document was accessed by each of the identified contributors, a length of time for which the identified document was accessed by each of the identified contributors, a list of modified content within the identified document by each of the identified contributors, a number of comments inserted into the identified document by each of the identified contributors, or a contributor of the identified contributors that created the identified document;

assigns a weight to each portion of the obtained access data; and determines the one or more authors of the identified document based on the assigned weight to each portion of the obtained access data;

determines the generated contribution score for a contributor of the identified contributors is above a contribution score threshold; and based on the determination, determines the contributor is an author of the identified document;

wherein the generated recommendation suggests a second document that has not been accessed by the UID;

generates the enterprise authorship database, the generated enterprise authorship database comprising the authorship record including the identified document, the associated UIDs of the determined one or more authors, and access data for the identified document;

determines the identified contributors do not include the UID;

wherein the identified relationship between the UID and the determined one or more authors is stored in a cache specific to the UID;

wherein the generated collaboration index includes a nexus between the first UID and the second UID;

wherein the nexus between the first UID and the second UID measures a collaboration strength between the first UID and the second UID; and determine a decreased level of collaboration between the first UID and the second UID, wherein the generated recommendation is to initiate additional collaboration between the first UID and the second UID.

While no personally identifiable information is tracked by aspects of the disclosure, examples have been described with reference to data monitored and/or collected from the users.

In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The invention claimed is:

1. A system comprising:

a memory storing an enterprise authorship database;

a processor communicatively coupled to the memory; and a time based assistant (TBA) implemented on the processor that:

identifies an enterprise document accessed by a user, an access history of the enterprise document reflecting content added to the enterprise document by contributors during generation of a final version of the enterprise document, wherein the final version of the enterprise document is generated in a workplace setting of an enterprise client;

calculates contribution scores for the contributors based on the access history of the final version of the enterprise document, each of the contribution scores measuring an overall contribution to the final version of the enterprise document by a corresponding one of the contributors based on amount(s) of content added to the final version of the enterprise document by the corresponding contributor, wherein different weights are assigned to text-based content than image-based content added to the final version of the enterprise document by the contributors when calculating the contribution scores, wherein the access history indicates comments inserted into the enterprise document by the contributors during generation of the final version of the enterprise document, and wherein the access history includes timestamps indicating when each of the contributors accessed the enterprise document for purposes of identifying which of the contributors added specific content to the final version of the enterprise document;

determines one or more authors of the final version of the enterprise document based on the contribution scores; and creates, within the enterprise authorship database, an authorship record associating user identifiers (UIDs) of the one or more authors with the final version of the enterprise document, wherein the authorship record is used to determine a favorite authors list of the user.

2. The system of claim 1, wherein the favorite authors list is used to recommend, to the user, documents that have not yet been accessed by the user.

3. The system of claim 1, wherein the access history indicates that the final version of the enterprise document was generated from one or more earlier versions of the enterprise document.

4. The system of claim 1, wherein the comments are removed from the enterprise document prior to finalization of the enterprise document.

5. The system of claim 1, wherein the comments are notes or annotations that are removed from the enterprise document prior to finalization of the enterprise document.

6. The system of claim 5, wherein the comments do not alter the content of the enterprise document.

7. A method comprising:

identifying an enterprise document accessed by a user, an access history of the enterprise document reflecting content added to the enterprise document by contributors during generation of a final version of the enterprise document, wherein the final version of the enterprise document is generated in a workplace setting of an enterprise client;

calculating contribution scores for the contributors based on the access history of the final version of the enterprise document, each of the contribution scores measuring an overall contribution to the final version of the enterprise document by a corresponding one of the contributors based on amount(s) of content added to the final version of the enterprise document by the corresponding contributor, wherein different weights are assigned to text-based content than image-based content added to the final version of the enterprise document by the contributors when calculating the contribution scores, wherein the access history indicates comments inserted into the enterprise document by the contributors during generation of the final version of the enterprise document, and wherein the access history includes timestamps indicating when each of the contributors accessed the enterprise document for purposes of identifying which of the contributors added specific content to the final version of the enterprise document;

determining one or more authors of the final version of the enterprise document based on the contribution scores; and creating, within an enterprise authorship database, an authorship record associating user identifiers (UIDs) of the one or more authors with the final version of the enterprise document, wherein the authorship record is used to determine a favorite authors list of the user.

8. The method of claim 7, wherein the favorite authors list is used to recommend, to the user, documents that have not yet been accessed by the user.

9. The method of claim 7, wherein the access history indicates that the final version of the enterprise document was generated from one or more earlier versions of the enterprise document.

10. The method of claim 7, wherein the comments are removed from the enterprise document prior to finalization of the enterprise document.

11. The method of claim 7, wherein the comments are notes or annotations that are removed from the enterprise document prior to finalization of the enterprise document.

12. The method of claim 11, wherein the comments do not alter the content of the enterprise document.

13. A computer-readable storage medium storing programming instructions for execution by a processor of a system, the programming instructions, upon execution by the processor, causing the system to perform the following operations:

identifying an enterprise document accessed by a user, an access history of the enterprise document reflecting content added to the enterprise document by contributors during generation of a final version of the enterprise document, wherein the final version of the enterprise document is generated in a workplace setting of an enterprise client;

calculating contribution scores for the contributors based on the access history of the final version of the enterprise document, each of the contribution scores measuring an overall contribution to the final version of the enterprise document by a corresponding one of the contributors based on amount(s) of content added to the final version of the enterprise document by the corresponding contributor, wherein different weights are assigned to text-based content than image-based content added to the final version of the enterprise document by the contributors when calculating the contribution scores, wherein the access history indicates comments inserted into the enterprise document by the contributors during generation of the final version of the enterprise document, and wherein the access history includes timestamps indicating when each of the contributors accessed the enterprise document for purposes of identifying which of the contributors added specific content to the final version of the enterprise document;

determining one or more authors of the final version of the enterprise document based on the contribution scores; and creating, within an enterprise authorship database, an authorship record associating user identifiers (UIDs) of the one or more authors with the final version of the enterprise document, wherein the authorship record is used to determine a favorite authors list of the user.

14. The computer-readable storage medium of claim 13, where the programming instructions further cause the system to perform the following operation:

generating a collaboration index based at least on the authorship record, wherein the collaboration index includes a nexus between a UID of the user and the UIDs of the one or more authors.

15. The computer-readable storage medium of claim 14, wherein the nexus between the UID of the user and the UIDs of the one or more authors measures a collaboration strength between the UID of the user and the UIDs of the one or more authors.

16. The computer-readable storage medium of claim 13, wherein the favorite authors list is used to recommend, to the user, documents that have not yet been accessed by the user.

17. The computer-readable storage medium of claim 13, wherein the access history indicates that the final version of the enterprise document was generated from one or more earlier versions of the enterprise document.

18. The computer-readable storage medium of claim 13, wherein the comments are removed from the enterprise document prior to finalization of the enterprise document.

19. The computer-readable storage medium of claim 13, wherein the comments are notes or annotations that are removed from the enterprise document prior to finalization of the enterprise document.

20. The computer-readable storage medium of claim 19, wherein the comments do not alter the content of the enterprise document.

* * * * *